(12) United States Patent
Okamoto

(10) Patent No.: US 9,950,548 B2
(45) Date of Patent: Apr. 24, 2018

(54) PRINT MANAGEMENT DEVICE, PRINT MANAGEMENT METHOD, AND PRINT MANAGEMENT PROGRAM

(71) Applicant: FUJIFILM Corporation, Tokyo (JP)

(72) Inventor: Takahiro Okamoto, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 17 days.

(21) Appl. No.: 15/460,492

(22) Filed: Mar. 16, 2017

(65) Prior Publication Data

US 2017/0182822 A1 Jun. 29, 2017

Related U.S. Application Data

(63) Continuation of application No. PCT/JP2015/077332, filed on Sep. 28, 2015.

(30) Foreign Application Priority Data

Sep. 29, 2014 (JP) .................................. 2014-198945
Sep. 29, 2014 (JP) .................................. 2014-198948

(51) Int. Cl.
*B41J 29/393* (2006.01)
*B41J 29/38* (2006.01)
(Continued)

(52) U.S. Cl.
CPC ............. *B41J 29/38* (2013.01); *B41J 29/393* (2013.01); *G06F 3/1204* (2013.01);
(Continued)

(58) Field of Classification Search
CPC ...... B41J 29/38; B41J 29/393; B41J 2/04508; G06F 3/1208; G06F 3/1204; G06F 3/1259

See application file for complete search history.

(56) References Cited

U.S. PATENT DOCUMENTS

2005/0111015 A1 5/2005 Tsujimoto
2011/0292415 A1 12/2011 Hayber
(Continued)

FOREIGN PATENT DOCUMENTS

JP 2000-003263 A 1/2000
JP 2001-134399 A 5/2001
(Continued)

OTHER PUBLICATIONS

International Search Report (ISR) (PCT Form PCT/ISA/210), in PCT/JP2015/077332, dated Dec. 1, 2015.
(Continued)

*Primary Examiner* — Yaovi M Ameh
(74) *Attorney, Agent, or Firm* — McGinn IP Law Group, PLLC

(57) ABSTRACT

The print management device includes a print management information acquisition unit that acquires print management information including first information indicating quality of a printed material printed in a print job during execution and second information indicating an evaluation index of the printed material, different from the first information, in the print job during execution, a print management request acquisition unit that acquires request information indicating a request relating to print management of the printed material in the print job, a request evaluation unit that evaluates the degree of satisfaction of the printed material printed in the print job for the request relating to the print management indicated by the request information, based on the print management information, using one or more evaluation references, and a printing condition change determination unit that determines whether change in printing conditions in the print job during execution is necessary, based on an evaluation result.

10 Claims, 17 Drawing Sheets

(51) Int. Cl.
*G06F 3/12* (2006.01)
*B41J 2/045* (2006.01)

(52) U.S. Cl.
CPC .......... *G06F 3/1208* (2013.01); *G06F 3/1259* (2013.01); *B41J 2/04508* (2013.01)

(56) References Cited

U.S. PATENT DOCUMENTS

| | | | | |
|---|---|---|---|---|
| 2014/0160534 | A1* | 6/2014 | Nakamura | H04N 1/00795 358/3.24 |
| 2015/0077800 | A1* | 3/2015 | Yamagishi | G06F 3/1204 358/1.15 |
| 2016/0188268 | A1 | 6/2016 | Yamagishi et al. | |

FOREIGN PATENT DOCUMENTS

| JP | 2005-070861 A | 3/2005 |
|---|---|---|
| JP | 2005-153374 A | 6/2005 |
| JP | 2005-221760 A | 8/2005 |
| JP | 2007-074290 A | 3/2007 |
| JP | 2010-219699 A | 9/2010 |
| JP | 2013-246722 A | 12/2013 |
| JP | 2014-116653 A | 6/2014 |

OTHER PUBLICATIONS

Written Opinion of the ISA/JPO (PCT/ISA/237) in PCT/JP2015/077332, dated Dec. 1, 2015 and English translation thereof.
Japanese Office Action dated Apr. 21, 2017 in JP Application No. 2014-198945 with an English translation thereof.
Japanese Office Action dated Apr. 21, 2017 in JP Application No. 2014-198948 with an English translation thereof.
German Office Action issued in German Application No. 11 2015 004 425.6 dated Jun. 8, 2017 with an English translation thereof.

* cited by examiner

FIG. 8

| F | Q | GRADATION | GRANULARITY | RUGGEDNESS | C | D |
|---|---|---|---|---|---|---|
| | COLOR REPRODUCTION | | | | | |
| 1.0 | 1.0 | 1.5 | 2.0 | 1.2 | 1.0 | 1.2 |

510

PRINT MANAGEMENT DEVICE, PRINT MANAGEMENT METHOD, AND PRINT MANAGEMENT PROGRAM

CROSS-REFERENCE TO RELATED APPLICATIONS

This application is a Continuation of PCT International Application No. PCT/JP2015/077332 filed on Sep. 28, 2015, which claims priority under 35 U.S.C. § 119(a) to Japanese Patent Applications No. 2014-198945 filed on Sep. 29, 2014 and No. 2014-198948 filed on Sep. 29, 2014. Each of the above applications is hereby expressly incorporated by reference, in their entirety, into the present application.

BACKGROUND OF THE INVENTION

1. Field of the Invention

The present invention relates to a print management device, a print management method, and a print management program, and more particularly, to a technique for optimizing printing conditions.

2. Description of the Related Art

In a printer, there is a case where an image quality defect such as a streak in a printed material during a print job occurs and a demand for the quality of the printed material is not satisfied. In a case where the demand for the quality of the printed material is not satisfied, the demand for the quality of the printed material may be satisfied by changing printing conditions.

Further, when determining printing conditions in a printer, a technique in consideration of quality, cost, and delivery has been provided.

JP2007-74290A discloses a failure diagnosis system that compares an inspection image obtained by optically reading an output image with a standard image for inspection to analyze a defect of the output image and to specify a cause of a failure. The output image in JP2007-74290A corresponds to a printed material in this specification.

JP2001-134399A discloses a printer selection method, a printer selection apparatus, and the like for selecting an optimal printer from a group of plural printers in terms of output image quality, printing time, and printing cost.

The terms of the printer, the output image quality, the printing time, and the printing cost in JP2001-134399A correspond to terms of a printer, quality, productivity, and cost in this specification.

JP2005-70861A discloses a data processor and the like for calculating a printer determination value by digitizing viewpoints such as printing process quality, printing process speed, and printing process cost, and comparing the printer determination value with a reference value to determine an output printer candidate.

The terms of the printer, the printing process quality, the printing process speed, and the print processing cost in JP2005-70861A correspond to terms of a printer, quality, and delivery, and cost in this specification, respectively.

JP2000-2363A discloses a method for predicting cost and image quality due to change in image processing parameters with respect to a color original image and determining print job parameters for selecting parameters based on the prediction result.

The terms of the image quality and the parameters in JP2000-2363A correspond to terms of quality and printing conditions in this specification, respectively.

SUMMARY OF THE INVENTION

However, in a case where printing conditions are changed based on knowledge of an operator of a printer, the burden of the operator becomes large. Further, if diagnosis and measure are performed by stopping a printer without changing printing conditions, this is not advantageous in terms of cost or delivery. In addition, if a printer is controlled without stopping the printer, only a part of quality such as a solid density is managed, and optimal printing conditions in consideration of cost or delivery necessary for management of overall quality or quality management of a printed material cannot be obtained.

In the failure diagnosis system disclosed in JP2007-74290A, since if image quality defects are found, the printer is stopped without considering balance between quality, cost, and delivery to perform diagnosis and measure, it is difficult to keep balance between quality, cost, and delivery. Thus, this technique is disadvantageous in terms of cost and delivery. Further, it is difficult to handle change in performance of a printer during printing when the change is not associated with to a failure.

In the printer selection method disclosed in JP2001-134399A and the data processor disclosed in JP2005-70861A, it is difficult to handle change in quality of a printed material in a print job due to change in performance of a printer. Further, these techniques relate to selection of a printer that performs printing from plural printers connected to a network, and do not relate to selection of optimal printing conditions for each printer.

In the method for determining print job parameters disclosed in JP2000-2363A, it is difficult to handle change in quality of a printed material during a print job due to change in performance of a printer. Further, it is necessary for an operator to select optimal printing parameters, and thus, the burden of the operator becomes large.

In order to solve the above problems, an object of the invention is to provide a print management device, a print management method, and a print management program capable of determining whether change in printing conditions is necessary according to change in performance of a printer during print job execution.

In order to achieve the above object, according to a first aspect of the invention, there is provided a print management device comprising: a print management information acquisition unit that acquires print management information of a printed material printed in a print job during execution, including first information indicating a quality of a printed material and second information indicating an evaluation index of the printed material, which is different from the first information, in the print job during execution; a print management request acquisition unit that acquires request information indicating a request relating to print management of the printed material in the print job; a request evaluation unit that evaluates the degree of satisfaction of the printed material printed in the print job for the request relating to the print management indicated by the acquired request information, based on the acquired print management information, using one or more evaluation references; and a printing condition change determination unit that determines whether change in printing conditions in the print job during execution is necessary, based on an evaluation result in the request evaluation unit.

According to the first aspect of the invention, since the print management information that includes the first information indicating at least the quality and the second information indicating the evaluation index of the printed material, which is different from the first information, is acquired in the print job during execution, the printed material is evaluated based on the acquired print management information, and the necessity of changing printing conditions in the print job during execution is determined based on the evaluation result, it is possible to perform change to optimal printing conditions suitable for the request relating to the print management.

According to a second aspect of the invention, the print management device according to the first aspect of the invention further comprises: a printing condition change execution unit that executes, if it is determined by the printing condition change determination unit that the change in the printing conditions is necessary, the change in the printing conditions in the print job during execution.

According to the second aspect of the invention, in a case where it is determined that the change in the printing conditions is necessary, it is possible to perform the change in the printing conditions.

As the change in the printing conditions, image data input to the printer may be changed.

According to a third aspect of the invention, the print management device according to the first aspect of the invention further comprises: a print stopping unit that stops printing if it is determined by the printing condition change determination unit that the change in the printing conditions is necessary.

According to the third aspect of the invention, in a case where it is determined that the change in the printing conditions is necessary, it is possible to perform diagnosis of the printer, and to perform maintenance of the printer based on a diagnosis result.

According to a fourth aspect of the invention, the print management device according to any one of the first aspect to the third aspect of the invention further comprises: a display unit that displays a determination result in the printing condition change determination unit.

According to the fourth aspect of the invention, it is possible for an operator to confirm the determination result, and to recognize a printing state.

According to a fifth aspect of the invention, the print management device according to any one of the first aspect to the fourth aspect of the invention further comprises: a printing condition change checking unit that checks, in a case where it is determined by the printing condition change determination unit that the change in the printing conditions in the print job during execution is necessary, the printing conditions after change.

According to the fifth aspect of the invention, it is possible to check printing conditions suitable for the request relating to the print management information, and to perform change to the printing conditions suitable for the request relating to the print management information based on a check result.

According to a sixth aspect of the invention, in the print management device according to the fifth aspect of the invention, the printing condition change checking unit comprises a printing condition change rule reference unit that makes reference to a predetermined printing condition change rule to check the printing conditions after change.

According to the sixth aspect of the invention, it is possible to check printing conditions suitable for the request relating to the print management information with reference to the printing condition change rule.

In the sixth aspect of the invention, it is preferable that a printing condition change rule storage unit that stores the printing condition change rule is provided.

According to a seventh aspect of the invention, in the print management device according to the fifth aspect of the invention, the printing condition change checking unit comprises a print management information prediction unit that predicts change in print management information in the printing conditions after change with respect to print management information in the printing conditions before change.

According to the seventh aspect of the invention, by predicting the change in the print management information when checking printing conditions, it is possible to check printing conditions suitable for the request relating to the print management information.

In the print management information change prediction in the seventh aspect of the invention, a function in which image data to be applied to a printed material during a print job is variable may be applied. Further, the function used in the print management information change prediction may be modified based on the print management.

According to an eighth aspect of the invention, in the print management device according to any one of the first aspect to the seventh aspect of the invention, the print management information acquisition unit acquires at least one of information indicating a quality of a printed material having a trade-off relationship with the first information, information indicating a quality of a printed material having a non-trade-off relationship with the first information, information indicating cost of a printed material, or information indicating a delivery of a printed material, as the second information.

According to the eighth aspect of the invention, it is possible to evaluate a printed material in a print job based on plural evaluation indexes in quality, evaluation indexes in quality and cost, evaluation indexes in quality and delivery, evaluation indexes in quality, cost and delivery, and to perform optimal printing based on many-sided evaluations from plural viewpoints.

In the eighth aspect of the invention, it is possible to acquire print management information including plural pieces of information relating to quality. Further, it is possible to acquire print management information including plural pieces of information relating to delivery. Furthermore, it is possible to acquire print management information including plural pieces of information relating to delivery.

According to a ninth aspect of the invention, in the print management device according to any one of the first aspect to the eighth aspect of the invention, the print management request acquisition unit acquires a request indicating a minimum request allowed in a printed material.

According to the ninth aspect of the invention, it is possible to perform change to printing conditions that satisfy a request relating to print management of a printed material in a print job. Further, it is possible to reduce change in printing conditions to the minimum, to thereby reduce fluctuation in a printing situation due to the change in the printing conditions.

According to a tenth aspect of the invention, in the print management device according to any one of the first aspect to the ninth aspect of the invention, the print management request acquisition unit acquires request information including priority information indicating priorities of the first information and the second information and an evaluation reference to be applied to the request evaluation unit.

According to the tenth aspect of the invention, it is possible to confirm the presence or absence of change in printing conditions based on the priorities indicated by the acquired priority information and the evaluation reference.

According to an eleventh aspect of the invention, in the print management device according to any one of the first aspect to the tenth aspect of the invention, the print management request acquisition unit acquires an evaluation function in which information included in the print management information is a variable as the priority information, and acquires a threshold value with respect to the evaluation function as the evaluation reference, and the request evaluation unit evaluates the degree of satisfaction of a printed material printed in the print job for the request relating to the print management indicated by the acquired request information, based on a comparison result obtained by comparing an evaluation value of the printed material printed in the print job, derived by the evaluation function, with the threshold value.

According to the eleventh aspect of the invention, it is possible to evaluate the degree of satisfaction of a printed material printed in a print job for the request relating to the print management indicated by the acquired request information, based on the comparison result obtained by comparing the evaluation value with the threshold value.

According to a twelfth aspect of the invention, in the print management device according to the eleventh aspect of the invention, the print management request acquisition unit acquires the evaluation function expressed as a polynomial including a term in which the first information is a variable and a term in which the second information is a variable, as the priority information.

According to the twelfth aspect of the invention, it is possible to generally evaluate an evaluation value of a printed material based on the first information and an evaluation value of the printed material based on the second information.

According to a thirteenth aspect of the invention, in the print management device according to the twelfth aspect of the invention, the print management request acquisition unit acquires the evaluation function which is the polynomial including the term in which the first information is a variable and the term in which the second information is a variable, in which a sign of the term in which the second information is a variable has a sign different from that of the term in which the first information is a variable in a case where the second information has a trade-off relationship with the first information and a sign of the term in which the second information is a variable is the same as that of the term in which the first information is a variable in a case where the second information has a non-trade-off relationship with the first information.

According to the thirteenth aspect of the invention, in a case where the first information and the second information have a trade-off relationship, and also, in a case where the first information and the second information have a non-trade-off relationship, it is possible to generally evaluate an evaluation value of a printed material based on the first information and an evaluation value of the printed material based on the second information.

According to a fourteenth aspect of the invention, there is provided a print management method comprising: a print management information acquisition step of acquiring print management information of a printed material printed in a print job during execution, including first information indicating a quality of a printed material and second information indicating an evaluation index of the printed material, which is different from the first information, in the print job during execution; a print management request acquisition step of acquiring request information indicating a request relating to print management of the printed material in the print job; a request evaluation unit step of evaluating the degree of satisfaction of the printed material printed in the print job for the request relating to the print management indicated by the acquired request information, based on the acquired print management information, using one or more evaluation references; and a printing condition change determination step of determining whether change in printing conditions in the print job during execution is necessary, based on an evaluation result in the request evaluation step.

In the fourteenth aspect of the invention, it is preferable that the print management method further comprises: a printing condition change execution step of executing, if it is determined in the printing condition change determination step that the change in the printing conditions is necessary, the change in the printing conditions in the print job during execution.

In the fourteenth aspect of the invention, it is preferable that the print management method further comprises: a print stopping step of stopping printing if it is determined in the printing condition change determination step that the change in the printing conditions is necessary.

In the fourteenth aspect of the invention, it is preferable that the print management method further comprises: a display step of displaying a determination result in the printing condition change determination step.

In the fourteenth aspect of the invention, it is preferable that the print management method further comprises: a printing condition change checking step of checking, in a case where it is determined in the printing condition change determination step that the change in the printing conditions in the print job during execution is necessary, the printing conditions after change.

It is preferable that the printing condition change checking step comprises a printing condition change rule reference step of making reference to a predetermined printing condition change rule to check the printing conditions after change or a print management information prediction step of predicting change in print management information in the printing conditions after change.

In the fourteenth aspect of the invention, it is preferable that the print management information acquisition process is performed to acquire at least one of information indicating a quality of a printed material having a trade-off relationship with the first information, information indicating a quality of a printed material having a non-trade-off relationship with the first information, information indicating cost of a printed material, or information indicating a delivery of a printed material, as the second information.

In the fourteenth aspect of the invention, it is preferable that the print management request acquisition process is performed to acquire a request indicating a minimum request allowed in a printed material.

In the fourteenth aspect of the invention, it is preferable that the print management request acquisition process is performed to acquire request information including priority information indicating priorities of the first information and the second information and an evaluation reference to be applied to the request evaluation step.

In the fourteenth aspect of the invention, it is preferable that the print management request acquisition process is performed to acquire an evaluation function in which information included in the print management information is a variable as the priority information, and to acquire a threshold value with respect to the evaluation function as the evaluation reference, and the request evaluation process is performed to evaluate the degree of satisfaction of a printed material printed in the print job for the request relating to the print management indicated by the acquired request information, based on a comparison result obtained by comparing an evaluation value of the printed material printed in the print job, derived by the evaluation function, with the threshold value.

In the fourteenth aspect of the invention, it is preferable that the print management request acquisition process is performed to acquire the evaluation function expressed as a polynomial including a term in which the first information is a variable and a term in which the second information is a variable, as the priority information.

In the fourteenth aspect of the invention, it is preferable that the print management request acquisition process is performed to acquire the evaluation function which is the polynomial including the term in which the first information is a variable and the term in which the second information is a variable, in which a sign of the term in which the second information is a variable has a sign different from that of the term in which the first information is a variable in a case where the second information has a trade-off relationship with the first information and a sign of the term in which the second information is a variable is the same as that of the term in which the first information is a variable in a case where the second information has a non-trade-off relationship with the first information.

According to a fifteenth aspect of the invention, there is provided a print management program that causes a computer to function as: print management information acquisition means for acquiring print management information of a printed material printed in a print job during execution, including first information indicating a quality of a printed material and second information indicating an evaluation index of the printed material, which is different from the first information, in the print job during execution; print management request acquisition means for acquiring request information indicating a request relating to print management of the printed material in the print job; request evaluation unit means for evaluating the degree of satisfaction of the printed material printed in the print job for the request relating to the print management indicated by the acquired request information, based on the acquired print management information, using one or more evaluation references; and printing condition change determination means for determining whether change in printing conditions in the print job during execution is necessary, based on an evaluation result in the request evaluation unit.

In the fifteenth aspect of the invention, it is preferable that the print management program causes the computer to further function as: printing condition change execution means for executing, if it is determined by the printing condition change determination means that the change in the printing conditions is necessary, the change in the printing conditions in the print job during execution.

In the fifteenth aspect of the invention, it is preferable that the print management program causes the computer to further function as: print stopping means for stopping printing if it is determined by the printing condition change determination means that the change in the printing conditions is necessary.

In the fifteenth aspect of the invention, it is preferable that the print management program causes the computer to further function as: display means for displaying a determination result in the printing condition change determination means.

In the fifteenth aspect of the invention, it is preferable that the print management program causes the computer to further function as: printing condition change checking means for checking, in a case where it is determined by the printing condition change determination means that the change in the printing conditions in the print job during execution is necessary, the printing conditions after change.

It is preferable that the printing condition change checking means causes the computer to function as printing condition change rule reference means for making reference to a predetermined printing condition change rule to check the printing conditions after change or print management information prediction means for predicting change in print management information in the printing conditions after change.

In the fifteenth aspect of the invention, it is preferable that the print management information acquisition means acquires at least one of information indicating a quality of a printed material having a trade-off relationship with the first information, information indicating a quality of a printed material having a non-trade-off relationship with the first information, information indicating cost of a printed material, or information indicating a delivery of a printed material, as the second information.

In the fifteenth aspect of the invention, it is preferable that the print management request acquisition means acquires a request indicating a minimum request allowed in a printed material.

In the fifteenth aspect of the invention, it is preferable that the print management request acquisition means acquires request information including priority information indicating priorities of the first information and the second information and an evaluation reference to be applied to the request evaluation means.

In the fifteenth aspect of the invention, it is preferable that the print management request acquisition means acquires an evaluation function in which information included in the print management information is a variable as the priority information, and acquires a threshold value with respect to the evaluation function as the evaluation reference, and the request evaluation means evaluates the degree of satisfaction of a printed material printed in the print job for the request relating to the print management indicated by the acquired request information, based on a comparison result obtained by comparing an evaluation value of the printed material printed in the print job, derived by the evaluation function, with the threshold value.

In the fifteenth aspect of the invention, it is preferable that the print management request acquisition means acquires the evaluation function expressed as a polynomial including a term in which the first information is a variable and a term in which the second information is a variable, as the priority information.

In the fifteenth aspect of the invention, it is preferable that the print management request acquisition means acquires the evaluation function which is the polynomial including the term in which the first information is a variable and the term in which the second information is a variable, in which a sign of the term in which the second information is a variable has a sign different from that of the term in which the first information is a variable in a case where the second information has a trade-off relationship with the first information and a sign of the term in which the second information is a variable is the same as that of the term in which the first information is a variable in a case where the second information has a non-trade-off relationship with the first information.

According to a sixteenth aspect of the invention, there is provided a print management device comprising: a print management information acquisition unit that acquires print management information of a printed material printed in a print job during execution, including first information indicating a quality of a printed material and second information indicating an evaluation index of the printed material, which is different from the first information, in the print job during execution; a print management request acquisition unit that acquires request information indicating a request relating to print management of the printed material in the print job; a request evaluation unit that evaluates the degree of satisfaction of the printed material printed in the print job for the request relating to the print management indicated by the acquired request information, based on the acquired print management information; a printing condition derivation unit that derives printing conditions in the print job during execution for relatively increasing the degree of satisfaction for the request relating to the print management indicated by the acquired request information, based on an evaluation result in the request evaluation unit; and a printing condition change execution unit that executes change in the printing conditions in the print job during execution to the derived printing conditions.

According to the sixteenth aspect of the invention, by deriving printing conditions for increasing the degree of satisfaction of a printed material printed in a print job during execution for the request relating to the print management and changing the printing conditions, it is possible to quickly handle fluctuation in a printing situation.

According to a seventeenth aspect of the invention, in the print management device according to the sixteenth aspect of the invention, the print management information acquisition unit acquires at least one of information indicating a quality of a printed material having a trade-off relationship with the first information, information indicating a quality of a printed material having a non-trade-off relationship with the first information, information indicating cost of a printed material, or information indicating a delivery of a printed material, as the second information.

According to the seventeenth aspect of the invention, it is possible to evaluate a printed material in a print job based on plural evaluation indexes in quality, evaluation indexes in quality and cost, evaluation indexes in quality and delivery, evaluation indexes in quality, cost and delivery, and to perform optimal printing based on many-sided evaluations from plural viewpoints.

In the seventeenth aspect of the invention, it is possible to acquire print management information including plural pieces of information relating to quality. Further, it is possible to acquire print management information including plural pieces of information relating to quality. Furthermore, it is possible to acquire print management information including plural pieces of information relating to quality.

According to an eighteenth aspect of the invention, in the print management device according to any one of the sixteenth aspect or seventeenth aspect of the invention, the print management request acquisition unit acquires a request indicating a minimum request allowed in a printed material.

According to the eighteenth aspect of the invention, it is possible to perform change to printing conditions that enhance the evaluation of a printed material in a print job. Further, it is possible to reduce change in printing conditions to the minimum, to thereby reduce fluctuation in a printing situation due to the change in the printing conditions.

According to a nineteenth aspect of the invention, the print management device according to any one of the sixteenth aspect to the eighteenth aspect of the invention further comprises: a display unit that displays the printing conditions derived by the printing condition derivation unit.

According to the nineteenth aspect of the invention, it is possible for an operator to confirm printing conditions after change.

According to a twentieth aspect of the invention, in the print management device according to any one of the sixteenth aspect to the nineteenth aspect of the invention, the printing condition derivation unit comprises a printing condition change rule reference unit that makes reference to a predetermined printing condition change rule to derive the printing conditions after change.

According to the twentieth aspect of the invention, it is possible to check printing conditions suitable for the request relating to the print management information with reference to the printing condition change rule.

In the twentieth aspect of the invention, it is preferable that a printing condition change rule storage unit that stores the printing condition change rule is provided.

According to a twenty first aspect of the invention, in the print management device according to any one of the sixteenth aspect to the twentieth aspect of the invention, the printing condition derivation unit comprises a print management information prediction unit that predicts change in print management information in the printing conditions after change with respect to print management information in the printing conditions before change.

According to the twenty first aspect of the invention, when deriving printing conditions after change, since change in print management information in the printing conditions after change with respect to print management information in the printing conditions before change is predicted, it is possible to derive printing conditions that satisfy the request relating to the print management.

In the print management information change prediction in the twenty first aspect of the invention, a function in which image data to be applied to a printed material during a print job is variable may be applied. Further, the function used in the print management information change prediction may be modified based on the print management information.

According to a twenty second aspect of the invention, in the print management device according to the twenty first aspect of the invention, the print management information prediction unit derives a prediction curve that represents an evaluation value when the printing conditions are changed using an evaluation function in which information included in the print management information is a variable, which is priority information indicating priorities of the first information and the second information, and derives the printing conditions after change using a maximum value or a largest value of the derived prediction curve.

According to the twenty second aspect of the invention, it is possible to perform change to optimal printing conditions based on the print management information change prediction.

According to a twenty third aspect of the invention, in the print management device according to any one of the sixteenth aspect to the twenty second of the invention, the print management request acquisition unit acquires an evaluation function in which information included in the print management information is a variable as priority information indicating priorities of the first information and the second information, and the request evaluation unit evaluates the degree of satisfaction of the printed material printed in the print job for the request relating to the print management indicated by the acquired request information according to whether an evaluation value for enhancing the evaluation of the printed material printed in the print job is derived from the evaluation function.

According to the twenty third aspect of the invention, it is possible to evaluate the degree of satisfaction of a printed material printed in a print job for the request relating to the print management indicated by the request information based on the evaluation value derived from the evaluation function.

According to a twenty fourth aspect of the invention, in the print management device according to any one of the sixteenth aspect to the twenty third aspect of the invention, the print management request acquisition unit acquires request information including one or more evaluation references, and the request evaluation unit evaluates the degree of satisfaction of the printed material printed in the print job for the request relating to the print management indicated by the acquired request information based on the acquired print management information, using the acquired one or more evaluation references.

As an example of the evaluation reference in the twenty fourth aspect of the invention, a threshold value of an evaluation function may be used.

According to a twenty fifth aspect of the invention, in the print management device according to the twenty fourth aspect of the invention, the print management request acquisition unit acquires an evaluation function in which information included in the print management information is a variable as priority information indicating priorities of the first information and the second information, and acquires a threshold value with respect to the evaluation function as each evaluation reference, and the request evaluation unit evaluates the degree of satisfaction of the printed material printed in the print job for the request relating to the print management indicated by the acquired request information, based on a comparison result obtained by comparing an evaluation value of the printed material printed in the print job, derived by the evaluation function, with the threshold value.

According to the twenty fifth aspect of the invention, it is possible to evaluate the degree of satisfaction of a printed material printed in a print job for the request relating to the print management indicated by the acquired request information, based on the comparison result obtained by comparing the evaluation function with the threshold value with respect to the evaluation function.

According to a twenty sixth aspect of the invention, in the print management device according to the twenty two aspect, the twenty third aspect, and the twenty fifth aspect of the invention, the print management request acquisition unit acquires the evaluation function expressed as a polynomial including a term in which the first information is a variable and a term in which the second information is a variable, as the priority information.

According to the twenty sixth aspect of the invention, it is possible to generally evaluate an evaluation value of a printed material based on the first information and an evaluation value of the printed material based on the second information.

According to a twenty seventh aspect of the invention, in the print management device according to the twenty sixth aspect of the invention, the print management request acquisition unit acquires the evaluation function which is the polynomial including the term in which the first information is a variable and the term in which the second information is a variable, in which a sign of the term in which the second information is a variable has a sign different from that of the term in which the first information is a variable in a case where the second information has a trade-off relationship with the first information and a sign of the term in which the second information is a variable is the same as that of the term in which the first information is a variable in a case where the second information has a non-trade-off relationship with the first information.

According to the twenty seventh aspect of the invention, in a case where the first information and the second information have a trade-off relationship, and also, in a case where the first information and the second information have a non-trade-off relationship, it is possible to generally evaluate an evaluation value of a printed material based on the first information and an evaluation value of the printed material based on the second information.

Priority information indicated by an evaluation function in which quality, cost, and delivery are variables may be acquired.

According to a twenty eighth aspect of the invention, there is provided a print management method comprising: a print management information acquisition step of acquiring print management information of a printed material printed in a print job during execution, including first information indicating a quality of a printed material and second information indicating an evaluation index of the printed material, which is different from the first information; a print management request acquisition step of acquiring request information indicating a request relating to print management of the printed material in the print job; a request evaluation step of evaluating the degree of satisfaction of the printed material printed in the print job for the request relating to the print management indicated by the acquired request information using one or more evaluation references, based on the acquired print management information; a printing condition derivation step of deriving printing conditions for relatively increasing the degree of satisfaction for the request relating to the print management indicated by the acquired request information, based on an evaluation result in the request evaluation step; and a printing condition change execution step of executing change in the printing conditions in the print job during execution to the derived printing conditions.

In the twenty eighth aspect of the invention, it is preferable that the print management method further comprises: a display step of displaying the printing conditions derived in the printing condition derivation step.

It is preferable that the printing condition derivation step comprises a printing condition change rule reference step of making reference to a predetermined printing condition change rule to check the printing conditions after change or a print management information prediction step of predicting change in print management information in the printing conditions after change with respect to print management information in the printing conditions before change.

In the twenty eighth aspect of the invention, it is preferable that the print management information acquisition step is performed to acquire at least one of information indicating a quality of a printed material having a trade-off relationship with the first information, information indicating a quality of a printed material having a non-trade-off relationship with the first information, information indicating cost of a printed material, or information indicating a delivery of a printed material, as the second information.

In the twenty eighth aspect of the invention, it is preferable that the print management request acquisition step is performed to acquire a request indicating a minimum request allowed in a printed material.

In the twenty eighth aspect of the invention, it is preferable that the print management request acquisition step is performed to acquire an evaluation function in which information included in the print management information is a variable as priority information indicating priorities of the first information and the second information, and the request evaluation step is performed to evaluate the degree of satisfaction of the printed material printed in the print job for the request relating to the print management indicated by the acquired request information according to whether an evaluation value for enhancing the evaluation of the printed material printed in the print job is derived from the evaluation function.

In the twenty eighth aspect of the invention, it is preferable that the print management request acquisition step is performed to acquire request information including one or more evaluation references, and the request evaluation step is performed to evaluate the degree of satisfaction of the printed material printed in the print job for the request relating to the print management indicated by the acquired request information based on the acquired print management information, using the acquired one or more evaluation references.

In the twenty eighth aspect of the invention, it is preferable that the print management request acquisition step is performed to acquire an evaluation function in which information included in the print management information is a variable as priority information indicating priorities of the first information and the second information, and to acquire a threshold value with respect to the evaluation function as each evaluation reference, and the request evaluation step is performed to evaluate the degree of satisfaction of the printed material printed in the print job for the request relating to the print management indicated by the acquired request information, based on a comparison result obtained by comparing an evaluation value of the printed material printed in the print job, derived by the evaluation function, with the threshold value.

In the twenty eighth aspect of the invention, it is preferable that the print management request acquisition step is performed to acquire the evaluation function expressed as a polynomial including a term in which the first information is a variable and a term in which the second information is a variable, as the priority information.

In the twenty eighth aspect of the invention, it is preferable that the print management request acquisition step is performed to acquire the evaluation function which is the polynomial including the term in which the first information is a variable and the term in which the second information is a variable, in which a sign of the term in which the second information is a variable has a sign different from that of the term in which the first information is a variable in a case where the second information has a trade-off relationship with the first information and a sign of the term in which the second information is a variable is the same as that of the term in which the first information is a variable in a case where the second information has a non-trade-off relationship with the first information.

According to a twenty ninth aspect of the invention, there is provided a print management program that causes a computer to function as: print management information acquisition means for acquiring print management information of a printed material printed in a print job during execution, including first information indicating a quality of a printed material and second information indicating an evaluation index of the printed material, which is different from the first information; print management request acquisition means for acquiring request information indicating a request relating to print management of the printed material in the print job; request evaluation means for evaluating the degree of satisfaction of the printed material printed in the print job for the request relating to the print management indicated by the acquired request information, based on the acquired print management information; printing condition derivation means for deriving printing conditions for relatively increasing the degree of satisfaction for the request relating to the print management indicated by the acquired request information, based on an evaluation result in the request evaluation means; and printing condition change execution means for executing change in the printing conditions in the print job during execution to the derived printing conditions.

In the twenty ninth aspect of the invention, it is preferable that the print management program causes the computer to further function as: display means for displaying the printing conditions derived by the printing condition derivation means.

In the twenty ninth aspect of the invention, it is preferable that the printing condition derivation means causes the computer to function as printing condition change rule reference means for making reference to a predetermined printing condition change rule to check the printing conditions after change or print management information prediction means for predicting change in print management information in the printing conditions after change with respect to print management information in the printing conditions before change.

In the twenty ninth aspect of the invention, it is preferable that the print management information acquisition means acquires at least one of information indicating a quality of a printed material having a trade-off relationship with the first information, information indicating a quality of a printed material having a non-trade-off relationship with the first information, information indicating cost of a printed material, or information indicating a delivery of a printed material, as the second information.

In the twenty ninth aspect of the invention, it is preferable that the print management request acquisition means acquires a request indicating a minimum request allowed in a printed material.

In the twenty ninth aspect of the invention, it is preferable that the print management request acquisition means acquires request information including priority information indicating priorities of the first information and the second information.

In the twenty ninth aspect of the invention, it is preferable that the print management request acquisition means acquires an evaluation function in which information included in the print management information is a variable as priority information indicating priorities of the first information and the second information, and the request evaluation means evaluates the degree of satisfaction of the printed material printed in the print job for the request relating to the print management indicated by the acquired request information according to whether an evaluation value for enhancing the evaluation of the printed material printed in the print job is derived from the evaluation function.

In the twenty ninth aspect of the invention, it is preferable that the print management request acquisition means acquires request information including one or more evaluation references, and the request evaluation means evaluates the degree of satisfaction of the printed material printed in the print job for the request relating to the print management indicated by the acquired request information based on the acquired print management information, using the acquired one or more evaluation references.

In the twenty ninth aspect of the invention, it is preferable that the print management request acquisition means acquires an evaluation function in which information included in the print management information is a variable as priority information indicating priorities of the first information and the second information, and acquires a threshold value with respect to the evaluation function as each evaluation reference, and the request evaluation means evaluates the degree of satisfaction of the printed material printed in the print job for the request relating to the print management indicated by the acquired request information, based on a comparison result obtained by comparing an evaluation value of the printed material printed in the print job, derived by the evaluation function, with the threshold value.

In the twenty ninth aspect of the invention, it is preferable that the print management request acquisition means acquires the evaluation function expressed as a polynomial including a term in which the first information is a variable and a term in which the second information is a variable, as the priority information.

In the twenty ninth aspect of the invention, it is preferable that the print management request acquisition means acquires the evaluation function which is the polynomial including the term in which the first information is a variable and the term in which the second information is a variable, in which a sign of the term in which the second information is a variable has a sign different from that of the term in which the first information is a variable in a case where the second information has a trade-off relationship with the first information and a sign of the term in which the second information is a variable is the same as that of the term in which the first information is a variable in a case where the second information has a non-trade-off relationship with the first information.

According to a first invention, by acquiring print management information that includes first information indicating at least quality and second information indicating an evaluation index of a printed material, which is different from the first information, in a print job during execution, evaluating the printed material based on the acquired print management information, and determining the necessity of changing printing conditions in the print job during execution based on the evaluation result, it is possible to perform change to optimal printing conditions suitable for a request relating to print management.

According to a second invention, by deriving printing conditions for increasing the degree of satisfaction of a printed material printed in a print job during execution for a request relating to print management and changing the printing conditions, it is possible to quickly handle fluctuation in a printing situation.

BRIEF DESCRIPTION OF THE DRAWINGS

FIG. 8 is a diagram illustrating a setting confirmation screen.

DESCRIPTION OF THE PREFERRED EMBODIMENTS

Hereinafter, preferred embodiments of the invention will be described in detail with reference to the accompanying drawings.

Figure 1:
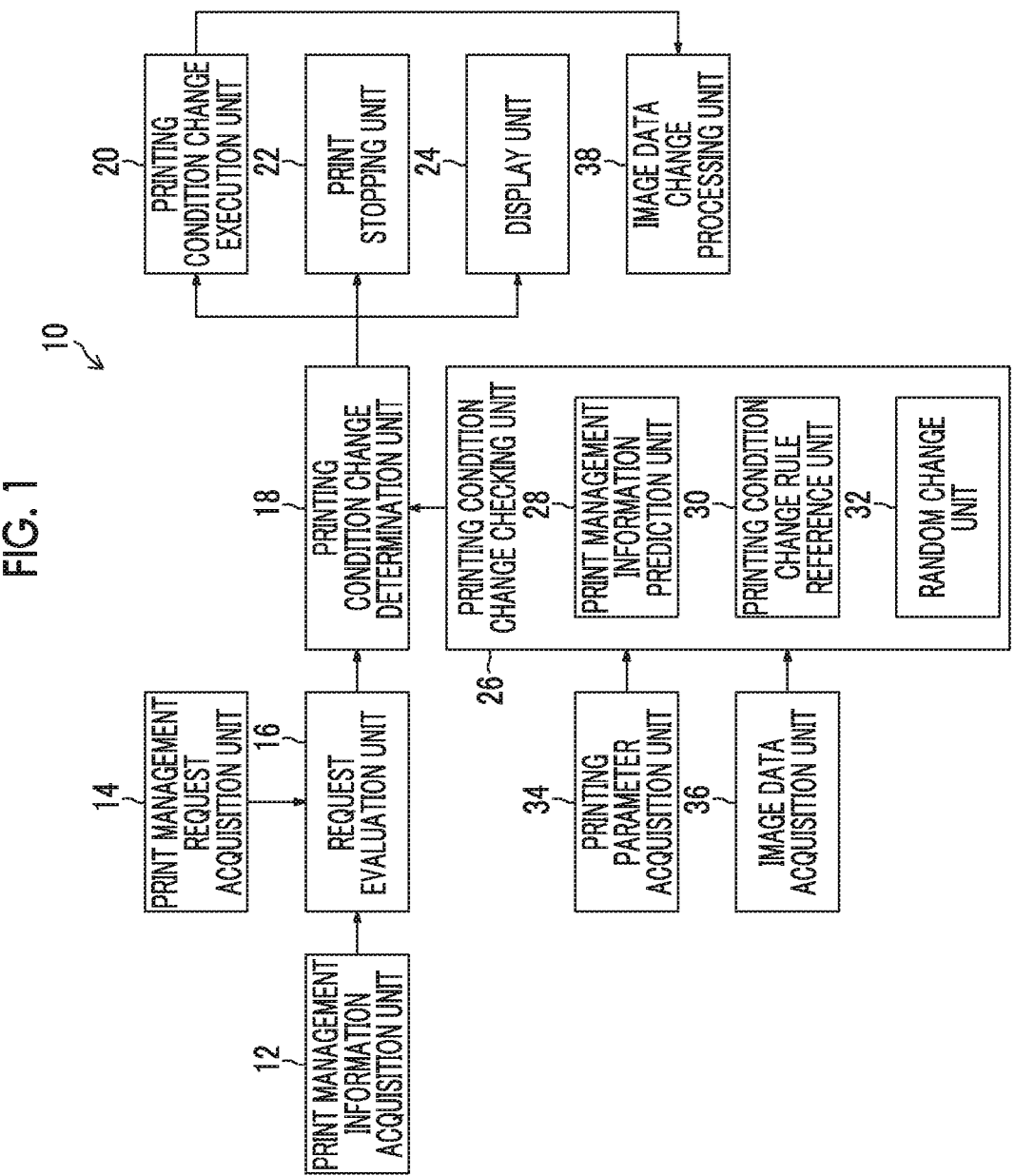
FIG. 1 is a diagram illustrating an overall configuration of a printing information management system according to a first embodiment of the invention.

First Embodiment: Overall Configuration of Printing Information Management System FIG. 1 is a diagram illustrating an overall configuration of a printing information management system according to a first embodiment of the invention. A printing information management system 10 shown in FIG. 1 includes a print management information acquisition unit 12, a print management request acquisition unit 14, and a request evaluation unit 16, and a printing condition change determination unit 18.

The print management information acquisition unit 12 acquires print management information indicating an evaluation index of a printed material, which is information acquired from a printed material during printing which is a printed material that is printed during a print job that is being executed, during the print job that is being executed. Further, the print management information acquisition unit 12 acquires at least two pieces of print management information which are print management information indicating different evaluation indexes.

The print job in this specification refers to a process of printing printed materials corresponding to a quantity requested from a client or the like, based on image data that is print-requested from the client or the like. The print job includes a so-called print lot.

The print management information includes at least first information and second information. The first information refers to print management information indicating a quality evaluation index of a printed material. The second information refers to print management information indicating an evaluation index of a printed material, different from the first information. The second information may be quality print management information indicating an evaluation of quality of a printed material, may be cost print management information indicating an evaluation of cost of the printed material, or may be delivery print management information indicating an evaluation of delivery of the printed material.

The first information and the second information may have a trade-off relationship, and may have a non-trade-off relationship. Alternatively, the trade-off relationship and the non-trade-off relationship may discretely change.

The number of acquired print management information is not limited to two. Third information and fourth information indicating evaluation indexes different from those of the first information and the second information may be appropriately added. Details about the print management information will be described later.

The print management request acquisition unit 14 acquires request information in a print job. The request information represents a request with respect to print management of a printed material. As an example of the print management request, a request for quality, a request for cost, a request for delivery may be used.

The request information includes priority information indicating a priority of print management information and information about a threshold value with respect to print management of a printed material, to be applied to an evaluation of the degree of satisfaction of a printed material using print management information. The threshold value with respect to the print management of the printed material functions as an evaluation reference to be applied to the evaluation of the degree of satisfaction of the printed material using the print management information.

As an example of the priority, a form in which quality is prioritized, a form in which quality is partially prioritized, a form in which cost is prioritized, and a form in which delivery is prioritized may be used. Further, a form in which the priority is changeable may be also used.

The presence or absence of the necessity of changing printing conditions may be confirmed based on the priority indicated by the acquired priority information, and the evaluation reference.

The request evaluation unit 16 evaluates the degree of satisfaction of a printed material during printing for a request relating to print management indicated by request information, based on one or more evaluation references. The evaluation in the request evaluation unit 16 may be an evaluation performed in two stages using one reference, or may be an evaluation performed in stages using two or more evaluation references.

That is, the request evaluation unit 16 evaluates a printed material during printing based on print management information acquired from the printed material during printing. Further, the request evaluation unit 16 compares the evaluation of the printed material during printing with the evaluation reference to determine whether the printed material during printing satisfies the evaluation reference.

In a case where it is determined by the request evaluation unit 16 that the evaluation of the printed material during printing does not satisfy the evaluation reference, the printing condition change determination unit 18 determines whether to change printing conditions or to stop printing.

Further, in a case where it is determined that the evaluation of the printed material during printing satisfies the evaluation reference, the printing condition change determination unit 18 determines whether enhancement of the evaluation is to expected with respect to the printed material during printing.

A printing condition change execution unit 20 shown in FIG. 1 changes printing conditions based on the determination result in the printing condition change determination unit 18. A print stopping unit 22 stops printing based on the determination result in the printing condition change determination unit 18. The determination result in the printing condition change determination unit 18 is displayed on the display unit 24.

As a display example of the determination result in the display unit 24, a form in which character information indicating the determination result is displayed on a screen of a display device may be used. Instead of the character information, voice information may be used.

The change of the printing conditions in the printing condition change execution unit 20 includes at least one of change in printing parameters or change in image data. As the printing parameters, parameters that function as operation parameters of a printer, such as an ink amount, a separation parameter, a half-tone parameter, a nozzle parameter, a driving voltage waveform, a printing speed, and a transport speed may be used.

The printing information management system 10 shown in FIG. 1 includes a printing condition change checking unit 26. The printing condition change checking unit 26 checks, in a case where printing conditions change, the printing conditions after change. The printing condition change checking unit 26 may check printing conditions suitable for a request relating to print management information, and may change the printing conditions to printing conditions suitable for the request relating to the print management information.

The printing condition change checking unit 26 includes a print management information prediction unit 28 that predicts change in print management information in printing conditions after change. The print management information prediction unit 28 predicts, even in a case where it is determined that enhancement of an evaluation for a printed material during printing is expected according to the change of the printing conditions, the change in the print management information in the printing conditions after change.

When changing the printing conditions, a printing condition change rule reference unit 30 makes reference to a printing condition change rule that is determined in advance. It is possible to check printing conditions suitable for a request relating to print management information with reference to the printing condition change rule.

The printing condition change rule regulates a relationship between printing parameters that form printing conditions and print management information. The printing condition change rule is created by a simulation or the like, and is stored in a database that serves as a printing condition change rule storage unit.

A random change unit 32 checks printing conditions using a method other than checking of printing conditions using print management information change prediction and checking of printing conditions with reference to a printing condition change rule.

The printing condition change checking unit 26 checks optimal printing conditions, printing conditions capable of being immediately changed, or the like from a change prediction result of print management information. By predicting change in print management information when checking printing conditions, it is possible to check printing conditions that satisfy a request relating to print management.

Printing conditions derived based on the check result is provided to the printing condition change execution unit 20. The printing condition change checking unit 26, the print management information prediction unit 28, the printing condition change rule reference unit 30, and the random change unit 32 serve as a printing condition change determination unit that determines printing conditions after change.

A printing parameter acquisition unit 34 acquires printing parameters from a printer. The acquired printing parameters are provided to the printing condition change checking unit 26. The printing parameters provided to the printing condition change checking unit 26 are used for print management information change prediction. The printer is indicated by reference numeral 100 in FIG. 5.

An image data acquisition unit 36 acquires image data from the printer. The acquired image data is provided to the printing condition change checking unit 26. The image data provided to the printing condition change checking unit 26 is used for print manage information change prediction. Details about the print management information change prediction and the optimal printing condition check in the printing condition change checking unit 26 will be described later.

An image data change processing unit 38 generates image data after change in a case where image data is changed in changing printing conditions. The image data after change is provided to the printer.

<Print Information Management Method>

Figure 2:
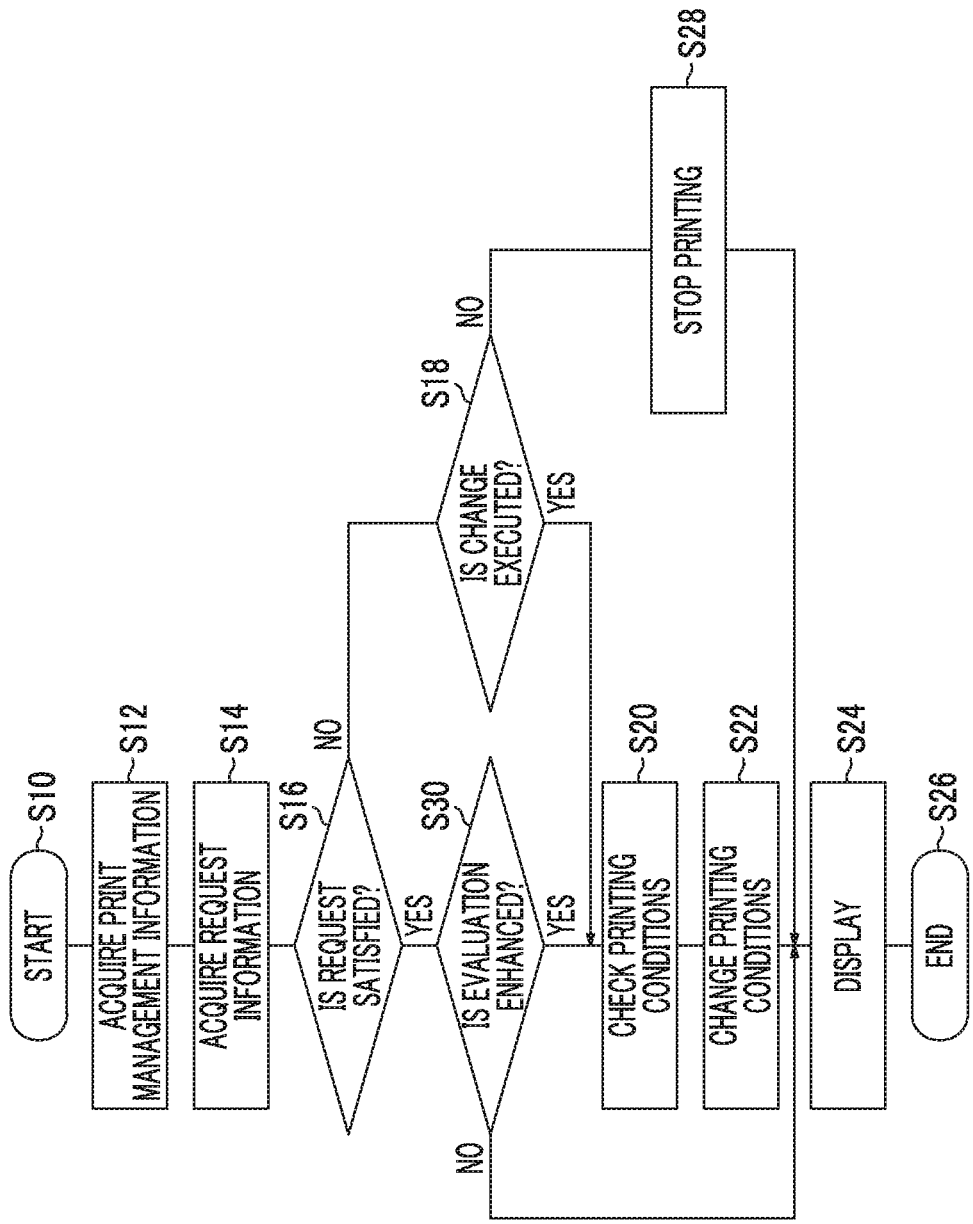
FIG. 2 is a flowchart illustrating a control flow of a printing information management method according to the first embodiment of the invention.

FIG. 2 is a flowchart illustrating a control flow of a print information management method according to the first embodiment of the invention.

If a control of a print management method is started in a starting process S10, print management information is acquired in a print management information acquisition process S12, and request information is acquired in a print management request acquisition process S14. The print management information acquisition process S12 and the print management request acquisition process S14 shown in FIG. 2 correspond to the print management information acquisition unit 12 and the print management request acquisition unit 14 shown in FIG. 1, respectively.

After the print management information and the request information are acquired, the degree of satisfaction of a printed material during printing for a request relating to print management indicated by the request information is evaluated based on one or more evaluation references in a request evaluation process S16 in FIG. 2.

That is, in the request evaluation process S16, the printed material during printing is evaluated from the acquired print management information, and an evaluation of the printed material during printing is compared with an evaluation reference to determine whether the printed material during printing satisfies the evaluation reference. The request evaluation process S16 corresponds to the request evaluation unit 16 and the printing condition change determination unit 18 shown in FIG. 1.

In a case where the printed material during printing does not satisfy the evaluation reference, that is, in a case where the determination is NO in the request evaluation process S16 in FIG. 2, the procedure proceeds to a printing condition change determination step S18.

In the printing condition change determination process S18, it is determined whether the printing conditions are to be changed or the printing is to be stopped. If it is determined that the printing conditions are to be changed, that is, in a case where the determination is YES in the printing condition change determination process S18, the procedure proceeds to a printing condition checking process S20. The printing condition change determination process S18 corresponds to the printing condition change determination unit 18 in FIG. 1.

In the printing condition checking process S20 in FIG. 2, the printing conditions after change are checked. As the check of the printing conditions, any one of print management information change prediction, reference to a printing condition change rule which is determined in advance, and random change may be applied. The printing condition checking process S20 corresponding to the printing condition change checking unit 26 in FIG. 1.

In a printing condition change execution process S22 in FIG. 2, the printing conditions are changed. The change of the printing conditions includes at least one of change in printing parameters or change in image data.

In a case where the printing conditions are not changed, that is, the determination is NO in the printing condition change determination process S18, the procedure proceeds to a print stopping process S28 to stop the printing. If the printing is stopped, the procedure proceeds to a display process S24. The print stopping process S28 corresponds to the print stopping unit 22 in FIG. 1.

If information indicating that the printing is stopped is displayed in the display process S24, the procedure proceeds to an end process S26. In the end process S26, the control of the print information management method is terminated. The display process S24 corresponds to the display unit 24 in FIG. 1.

In a case where the printed material during printing satisfies the evaluation reference, that is, in a case where the determination is YES in the request evaluation process S16 in FIG. 2, the procedure proceeds to an evaluation enhancement determination process S30. In the evaluation enhancement determination process S30, it is determined whether enhancement of the evaluation is to be expected with respect to the printed material during printing. The evaluation enhancement determination process S30 corresponds to the printing condition change determination unit 18 in FIG. 1.

In a case where the enhancement of the evaluation for the print management request is not expected, that is, in a case where the determination is NO in the evaluation enhancement determination process S30, the procedure proceeds to step S24. In a case where the determination is YES in the evaluation enhancement determination process S30, that is, in a case where the enhancement of the evaluation for the print management request is expected, the procedure proceeds to the printing condition checking process S20, and proceeds to the printing condition change execution process S22.

The processes of the printing condition checking process S20 and the printing condition change execution process S22 are the same as in a case where the procedure proceeds to the printing condition checking process S20 and the printing condition change execution process S22 according to the determination of YES in the printing condition change determination process S18, and description thereof will not be repeated.

In the display process S24, a display indicating that the printing conditions are changed or a display indicating that the printing conditions are not changed is performed. In the display process S24, in a case where the display indicating that the printing conditions are changed, the printing conditions after change may be displayed. In the end process S26, an end process of the control of the print information management method is executed.

<Print Management Information>

Print management information will be described in detail. The print management information is divided into three types of information of quality print management information indicating a quality evaluation index, cost print management information indicating a cost evaluation index, and delivery print management information indicating a delivery evaluation index.

The quality print management information, the cost print management information, and the delivery print management information may be referred to as Q information, C information, and D information using initials of quality, cost, and delivery, respectively. The quality, cost, and delivery may be generally referred to as QCD. Further, the Q information, C information, and D information may be generally referred to as QCD information.

<Quality Print Management Information>

As an example of the quality print management information, a basic image quality quantitative value, an image quality defect quantitative value, and a quality quantitative value other than an image quality quantitative value may be used. It is preferable that the basic image quality quantitative value, the image quality defect quantitative value, and the quality quantitative value other than the image quality quantitative value can be used as variables of the same function, respectively.

As an example of the basic image quality quantitative value, a value obtained by quantifying color reproduction, gradation, granularity, resolution, ruggedness, character, sharpness, gloss, or the like may be used. A quality evaluation index which is a target of the basic image quality quantitative value is not limited to the above-mentioned values, and may be an index capable of being acquired from a printed material during printing or an index capable of being acquired from a printer, capable of being quantified.

As the basic image quality quantitative value, an absolute value may be applied, or a value obtained by digitizing a distribution on a printing surface may be applied. As the basic image quality quantitative value, a value quantified by applying a known quantifying method, such as a quantified value based on ISO13660 Standard, may be applied.

The image quality attribute measurement standard ISO13660 for binary monochrome hardcopy is a hardcopy image quality measurement standard that assumes a scanner as a measuring device and does not need a test chart. ISO is an abbreviation of International Organization for Standardization.

As an example of the image quality defect quantitative value, a value obtained by quantifying an image quality defect such as streak, unevenness, or stain may be used. The streak refers to omission of dots or density unevenness due to overlapping arrangement of dots. The unevenness refers to cyclic density unevenness due to a variation in ejecting characteristics of respective nozzles. The stain refers to dot-like density unevenness.

As a method for quantifying streak, a method for evaluating unevenness based on a difference value between a sample image and a target image and quantifying the difference value may be applied. Further, image quality defects other than streak, such as unevenness or stain may be quantified using a known quantification method.

The quality evaluation index which is a target of the image quality quantitative value is not limited to the above-mentioned values, and may be an index capable of being acquired from a printed material during printing or an index capable of being acquired from a printer.

As the quality quantitative value other than the image quality quantitative value, a value obtained by quantifying a state of a printing medium such as stacker blocking, a paper passing characteristic, or cockle may be used. The stacker blocking refers to a state where when printed materials which are printed are piled, a printed material is attached to an upper or lower printed material. In this case, the ease of separation when the printed materials which are printed are piled is quantified.

In the case of the paper passing characteristic, how easily a printing medium passes without being in contact with a structure disposed around a transport path is quantified. In the case of the cockle, the degree of deformation of a printing surface in a printing medium in a state where ink penetrates in the printing medium is quantified. With respect to a state of a printed medium, a known quantification method may be applied.

<Method for Acquiring Quality Print Management Information>

As an example of a method for acquiring quality print management information, a form in which a client region of a printed material is measured and its measurement result is quantified may be used. The client region of the printed material refers to a final product corresponding region which becomes a final product in a printed material.

As a method for measuring color reproduction, gradation, granularity, and the like in a case where the basic image quality quantitative value is to be acquired and in a case where the image quality defect quantitative value is to be acquired, a form in which a client region is read using an imaging device such as a scanner and an evaluation value of the read data is generated for quantification may be used. A value quantified based on an image quality attribute measurement method regulated in the ISO13660 may be used as the quantitative value.

Further, a measurement value obtained using a measuring device that measures an evaluation index which is a target of the basic image quality quantitative value and an evaluation index which is a target of the image quality defect quantitative value may be quantified as the quantitative value.

In a case where the quality quantitative value other than image quality quantitative value is to be acquired, for example, the degree of scratching on an image printed in the client image may be observed, and its observation result may be quantified acquire a quantitative value of the stacker blocking or paper passing characteristic.

The amount of deformation of a client region with respect to a flat printing medium in which the cockle does not occur may be measured, and its measurement value may be quantified acquire a quantitative value of the cockle.

<Another Example of Method for Aacquiring Quality Print Management Information>

As another example of a method for acquiring quantity print management information, a form in which a margin region other than a client region of a printed material is measured and quality of the printed material is evaluated based on the measurement result to acquire a quantitative value of the evaluation may be used.

For example, by forming a nozzle check pattern in a margin region and measuring the nozzle check pattern, quality of an image formed in a client region may be evaluated. The method for acquiring the quality print management information is not limited to this example, and may employ various methods.

<Cost Print Management Information>

It is preferable that the cost print management information can be used as a variable of the same function as that of the quality print management information and the delivery print management information.

As an example of the cost print management information, values obtained by quantifying variable cost of a printer, fixed cost of the printer, labor cost of an operator, and the like may be used. The variable cost of the printer may include ink cost, printing medium cost, power cost of the device, and the like. The fixed cost of the printer may include purchase cost of the printer, maintenance cost of the printer, and the like.

The cost print management information may be calculated from ink cost, printing medium cost, power cost of the device, and the like.

<Delivery Print Management Information>

It is preferable that the delivery print management information may be used as a variable of the same function as that of the quality print management information and the cost print management information.

As an example of the delivery print management information, a value obtained by quantifying a delivery deadline of a printed material may be used. The delivery print management information may be calculated from a condition such as a printing speed, or may be given from the outside. The printing speed may be the number of printed materials per unit time.

<Request Information and Printing Condition Change Determination>

The request information acquired by the print management request acquisition unit 14 shown in FIG. 1 will be described in detail. In the following description, an example in which a priority of print management information and a threshold value are acquired as the request information will be described.

Figure 3:
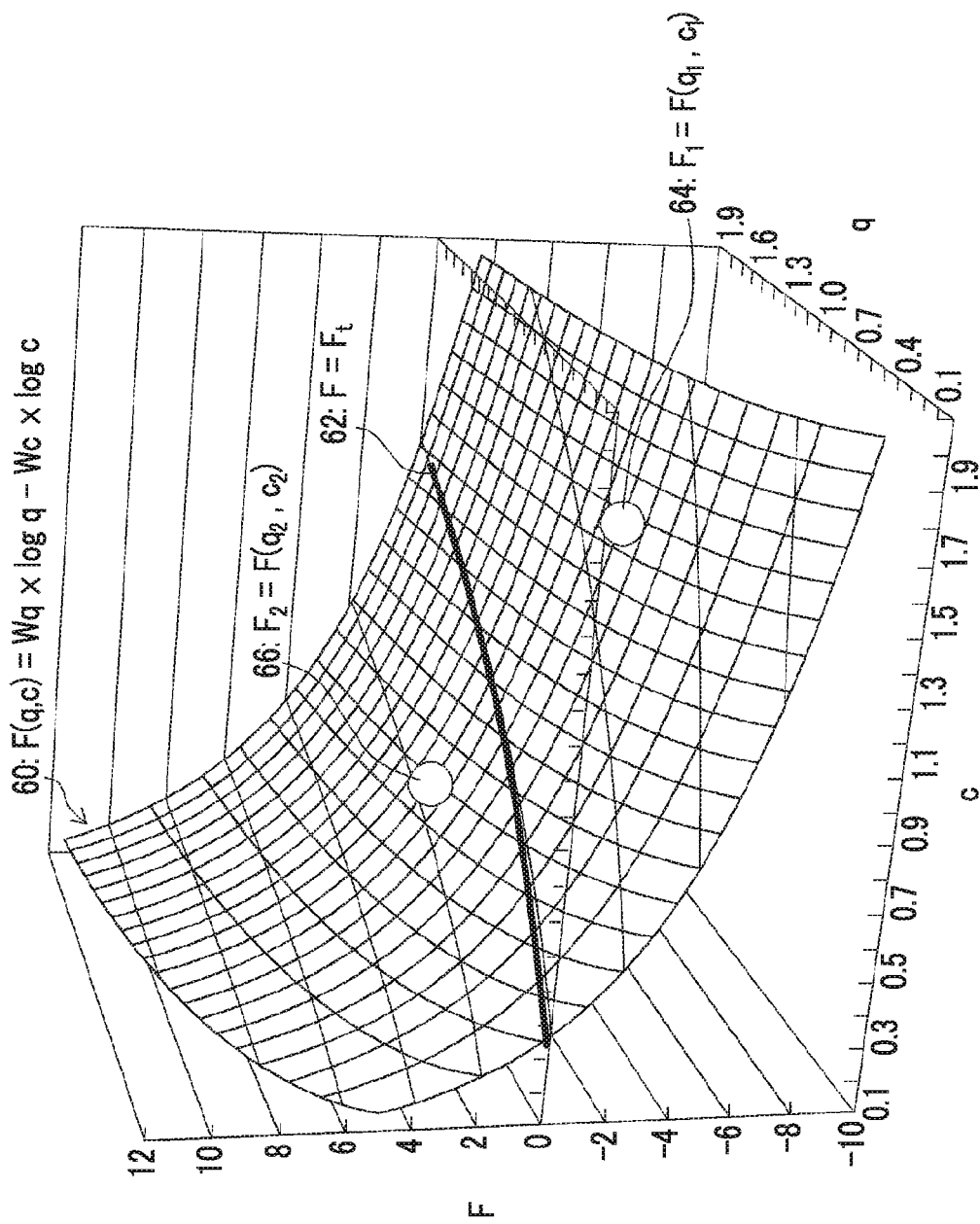
FIG. 3 is a diagram illustrating an example of information.

FIG. 3 is a diagram illustrating an example of request information. Numerical values shown in FIG. 3 represent arbitrary numerical values used for ease of description, and do not limit the invention according to this embodiment. This is similarly applied to other drawings.

The priority of the print management information acquired as the request information is expressed by an evaluation function F shown in Expression (1).

$$F(q, c, d) = W_q \times \log q - W_c \times \log c - W_d \times \log d \quad (1)$$

$W_q$, $W_c$, and $W_d$ of the evaluation function F are constants of quality, cost, and delivery, respectively, and represent weights of respective terms in the evaluation function F. The $W_q$, $W_c$, and $W_d$ of the evaluation function F are determined by a request for print management. Here, "q" represents a variable to which a quantitative value of the quality print management information is to be input, "c" represents a variable to which a quantitative value of the cost print management information is to be input, and "d" represents a variable to which a quantitative value of the delivery print management information is to be input. The variables q, c, and d are determined by a physical phenomenon in printing.

The evaluation function (q, c, d) is expressed as a polynomial including a term in which the quantitative value q of the quality print management information is a variable, a term in which the quantitative value c of the cost print management information is a variable, and a term in which the quantitative value d of the delivery print management information is a variable. The first term of the evaluation function F(q, c, d) represents an evaluation value relating to quality. The second term of the evaluation function F(q, c, d) represents an evaluation value relating to cost. The third term of the evaluation function F(q, c, d) represents an evaluation value of delivery.

In other words, the evaluation function F(q, c, d) is configured to calculate an evaluation value obtained by representing a value of a printed material during printing as a numerical value. The evaluation function F(q, c, d) is configured to calculate an evaluation value by generally evaluating quality, cost, and delivery corresponding to the respective terms.

If a quality evaluation value calculated by the first term of the evaluation function F(q, c, d) is relatively large, the value of the evaluation function F(q, c, d) becomes relatively large, and the evaluation of the printed material becomes high. On the other hand, if a cost evaluation value calculated by the second term of the evaluation function F(q, c, d) and a delivery evaluation value calculated by the third term of the evaluation function F(q, c, d) are relatively small, the value of the evaluation function F(q, c, d) becomes relatively large, and the evaluation of the printed material becomes high.

In this way, even in a case where evaluation indexes having a trade-off relationship are included, it is possible to calculate an evaluation value with the evaluation indexes balanced.

A negative sign of the constant We in the second term of the evaluation function F(q, c, d) represents that the quality which is the variable of the first term and the cost which is the variable of the second term have a trade-off relationship. Similarly, a negative sign of the constant $W_d$ in the third term of the evaluation function F(q, c, d) represents that the quality which is the variable of the first term and the delivery which is the variable of the third term have a trade-off relationship.

By appropriately adjusting the constant $W_q$, the constant $W_c$, and the constant $W_d$ of the respective terms of the evaluation function F(q, c, d), it is possible to change relative weights between the respective terms in the evaluation function F(q, c, d), and to appropriately set priorities of the respective terms. That is, the evaluation function is expressed as a polynomial in which constants indicating weights of respective terms are included in the respective terms.

An evaluation function 60 shown in FIG. 3 represents an evaluation function F(q, c) in which the variable d of the third term in the evaluation function F(q, c, d) in Expression (1) is fixed. A q-axis in FIG. 3 represents a quantitative value of the quality print management information, in which as a numerical value thereof becomes larger, the quality becomes higher. A c-axis in FIG. 3 represents a quantitative value of the cost print management information, in which as a numerical value thereof becomes larger, the cost becomes larger, and cost evaluation becomes lower.

An F-axis in FIG. 3 represents an evaluation value of a printed material during printing, which is an evaluation function value. As a numerical value of the F-axis becomes larger, evaluation of the printed material during printing becomes higher.

In the following description, for ease of description and illustration, it is assumed that the evaluation function F(q, c) in which the variable d of the third term in the evaluation F(q, c, d) in Expression (1) is fixed is used.

A threshold value 62 shown in FIG. 3 represents a threshold value with respect to the evaluation function 60. When the threshold value 62 is $F_t$, $F=F_t$.

A value $F_1$ of the evaluation function 60, which is given reference numeral 64 in FIG. 3, is an evaluation value of a printed material during printing in a case where a quantitative value $q_1$ is acquired as the quality print management information and a quantitative value $c_1$ is acquired as the cost print management information. The evaluation value $F_1$ is expressed as $F_1=F(q_1, c_1)$.

A value $F_2$ of the evaluation function 60, which is given reference numeral 66 in FIG. 3, is an evaluation value of a printed material during printing in a case where a quantitative value $q_2$ is acquired as the quality print management information and a quantitative value $c_2$ is acquired as the cost print management information. The evaluation value $F_2$ is expressed as $F_2=F(q_2, c_2)$.

The evaluation value $F_1$ is a value which is smaller than the threshold value $F_t$. In other words, in a case where the evaluation value F of a printed material which is a value of the evaluation function $F(q, c)$ and the threshold value $F_t$ has a relationship of $F<F_t$, it may be determined that the printed material during printing does not satisfy a request relating to print management.

On the other hand, the evaluation value $F_2$ is a value which is equal to or larger than the threshold value $F_t$. In other words, in a case where the evaluation value F of the printed material which is the value of the evaluation function $F(q, c)$ and the threshold value $F_t$ has a relationship of $F \geq F_t$, it may be determined that the printed material during printing satisfies the request relating to the print management.

In this embodiment, a case where the variable d of the third term of the evaluation function F in Expression (1) is fixed has been described, but by setting an appropriate threshold value $F_t$ in the evaluation function F, it is possible to determine whether a printed material during printing satisfies a request relating to print management based on a comparison result obtained by comparing the evaluation function $F(q, c, d)$ with the threshold value $F_t$, similar to the case where the variable d of the third term of the evaluation function F in Expression (1) is fixed.

Further, in this embodiment, a form in which it is determined whether a printed material during printing satisfies a request relating to print management using one threshold value $F_t$ has been described, but by using plural threshold values $F_{t1}$, $F_{t2}$, $F_{t3}$, and so on, the degree of request satisfaction of a printed material during printing satisfies may be evaluated in stages.

In this way, when determining whether a printed material during printing satisfies a request relating to print management, by generally determining whether quality, cost, and delivery are in a best state, it is possible to select an appropriate countermeasure suitable for the request relating to the print management compared with a countermeasure of increasing the amount of ink if a density goes down, a countermeasure of stopping printing if an image quality defect occurs, for example.

<Printing Condition Change>

In a case where a printed material during printing does not satisfy a request relating to print management, it is determined whether printing conditions are to be changed or printing is to be stopped. The change of the printing conditions includes execution of at least one of change in printing parameters or change in image data.

As an example of printing parameters, an ink amount, a separation parameter, a half-tone parameter, a nozzle parameter, a drive voltage waveform, a printing speed, or the like may be used.

The ink amount is a printing parameter indicating the amount of ink for each pixel determined from a gradation value for each pixel.

The separation parameter defines a separation condition in a separation process. The separation parameter is a printing parameter used for a separation process of determining data about the amount of ink for each color.

The half-tone parameter is a printing parameter that defines a processing condition in a half-tone process in a printer. As an example of the half-tone parameter, a half-tone pattern may be used.

The nozzle parameter is a printing parameter that defines a characteristic for each nozzle. As an example of the nozzle parameter, a gamma correction coefficient, a density unevenness correction coefficient, or the like, may be used.

The drive voltage waveform is a printing parameter that defines an ejecting condition when a head is operated to eject ink.

The printing speed is a printing parameter that defines a relative transport speed between a printing medium and a head.

The printing parameters are not limited to the above-mentioned examples, which may be added due to performance of a printer, for example.

The change of the printing parameters may be selective change in a part of printing parameters set with respect to printing which is being executed, or may be change in all printing parameters.

As a change example of image data, in a case where streak or unevenness occurs due to the existence of a nozzle of which an ejecting characteristic changes, an image position movement for moving a printing position of the nozzle of which the ejecting characteristic changes to a non-printing position may be used.

As another change example of image data, in a case where a defect that occurs in a printed material due to a printer is detected and a component similar to the defect that occurs in the printed material due to the printer is included in the image data, an image data change for subtracting the component similar to the defect that occurs in the printed material due to the printer from the image data may be used.

The change of the printing parameters and the change of the image data are not limited to the above-described examples. Change of printing parameters and change of image data capable of being handled in a printer may be applied. The changed printing parameters and the changed image data are transmitted to the printer.

<Print Management Information Change Prediction>

In a case where it is determined that printing conditions are changed in the printing condition change determination unit 18 shown in FIG. 1 and the printing condition change determination process S18 shown in FIG. 2, change in print management information is predicted in the changed printing conditions.

By predicting the change in the print management information in the changed printing conditions, it is possible to obtain appropriate printing conditions. Hereinafter, specific examples of the print management information change prediction will be described.

<First Specific Example of Print Management Information Change Prediction>

In a print management information change prediction according to a first specific example, print management information is predicted by defining print management information using a function in which printing parameters and image data are variables.

A function $q(u, x, y, z)$, a function $c(u, x, y, z)$, and a function $d(u, x, y, z)$ in which arbitrary printing parameters x, y, and z are variables and image data u is a variable are created, with respect to a quantitative value q of quality print management information, a quantitative value c of cost print management information, and a quantitative value d of delivery print management information.

The number of printing parameters applied to the variables of the function q(u, x, y, z), the function c(u, x, y, z), and the function d(u, x, y, z) is not limited to three. The number of printing parameters applied to the variables of the function q(u, x, y, z), the function c(u, x, y, z), and the function d(u, x, y, z) may be two or smaller, or may be four or greater.

Further, with respect to the function c(u, x, y, z) corresponding to the cost print management information and the function d(u, x, y, z) corresponding to the delivery print management information, in a case where contribution of the image data u is sufficiently smaller than contribution of the printing parameters x, y, and z, in a case where the contribution of the image data u is ignorable, or in a case where the image data u can be handled as a constant, for example, the image data u may be excluded from the variables.

It is assumed that the printing parameter x is an ink amount $P_v$, the printing parameter y is a printing speed $P_s$, and the printing parameter z is a separation parameter $P_e$. Further, a function $Q_m(u)$ in which the image data u is a variable is defined.

The function q(u, x, y, z), the function c(u, x, y, z), and the function d(u, x, y, z) are expressed by Expression (2), Expression (3), and Expression (4).

$$q(Q_m, P_v, P_s, P_e) = (Q_v \times P_v + Pv + Q_s/P_s + Q_e/P_e) \times Q_m(u) \qquad (2)$$

$$c(P_e) = C_e/P_e \qquad (3)$$

$$d(P_s) = D_s \times P_s \qquad (4)$$

$Q_v$, $Q_s$, and $Q_e$ in Expression (2), $C_e$ in Expression (3), and $D_e$ in Expression (4) are constants determined from performance of a printer.

By defining the function q(u, x, y, z) corresponding to the quality print management information, the function c(u, x, y, z) corresponding to the cost print management information, and the function d(u, x, y, z) corresponding to the delivery print management information, it is possible to predict print management information indicating function values when printing parameters which are variables are changed.

Further, since a function used for print management information change prediction uses image data as a variable, it is also possible to predict print management information change in a case where the image data is changed.

By preparing plural functions with respect to each of the function q(u, x, y, z) corresponding to the quality print management information, the function c(u, x, y, z) corresponding to the cost print management information, and the function d(u, x, y, z) corresponding to the delivery print management information in a database, it is possible to select a function suitable for printing conditions during printing from the plural functions in the database.

As an example of the function selection, a form in which a print job and a function are associated with each other and a function of a similar print job is selected may be used.

The constants $Q_v$, $Q_s$, and $Q_e$ in Expression (2), the constant $C_e$ in Expression (3), and the constant $D_s$ in Expression (4) may be modified based on current print management information. The current print management information refers to latest information among acquired print management information.

Hereinafter, an example in which the constant $Q_v$, the constant $Q_s$ and the constant $Q_e$ in Expression (2) are modified based on current quality print management information will be described.

An ink amount Pi11, a printing speed $P_s$ii, a separation parameter Pe11, and image data $Q_{m11}$ in a current printer are substituted in Expression (2) to calculate a value of $q(Q_{m11}, P_{v11}, P_{s11}, P_{e11})$.

The value of $q(Q_{m11}, P_{v11}, P_{s11}, P_{e11})$ is represented as $q_{11}$. The value $q_{11}$ is subtracted from a quantitative value $q_{10}$ of the current quality print management information to calculate a difference value $q_A = q_{10} - q_{11}$. The difference value $q_A$ represents a difference between a quality of a printed material which is actually obtained and a theoretical quality of the printed material.

The difference value $q_A$ is distributed into the constant $Q_v$, the constant $Q_s$, and the constant $Q_e$. For example, a value $q_A/3$ is obtained by dividing the difference value $q_A$ by 3 is equally distributed into the constant $Q_v$, the constant $Q_s$, and the constant $Q_e$. The difference value $Q_A$ may be distributed by appropriate weighting.

A constant $Q_{v12}$, a constant $Q_{s12}$, and a constant $Q_{e\,12}$ after change are expressed by Expression (5), Expression (6), and Expression (7), respectively.

$$Q_{v12} = (q_{10} - q_A)/(3 \times Q_{m11} \times P_{v11}) \qquad (5)$$

$$Q_{s12} = (q_{10} - q_A) \times s_{11}/(3 \times Q_{m11}) \qquad (6)$$

$$Q_{e12} = (q_{10} - q_A) \times P_{e11}/(3 \times Q_{m11}) \qquad (7)$$

In this way, by modifying constants of functions to be applied to print management information prediction after printing conditions are changed to be suitable for printing conditions after change, it is possible to maintain the accuracy of print management information prediction.

<Second Specific Example of Print Management Information Change Prediction>

Figure 4:
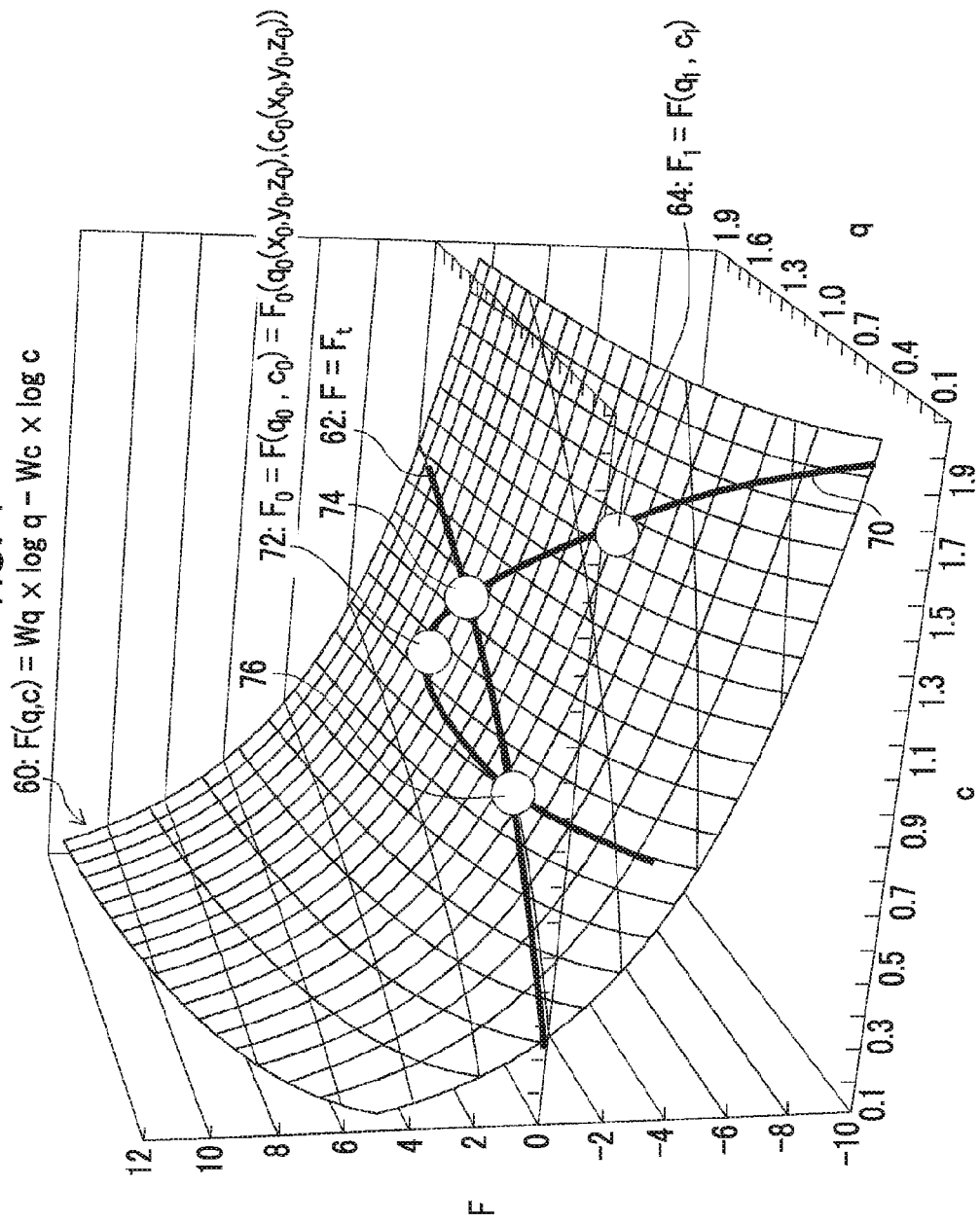
FIG. 4 is a diagram illustrating a second specific example of change prediction of print management information.

As a second specific example of print management information change prediction, an example in which the evaluation function in Expression (1) is used will be described. FIG. 4 is a diagram illustrating the second specific example of the print management information change prediction. In FIG. 4, the same numerical values are given to the same or similar portions as in FIG. 3, and description thereof will be appropriately omitted.

In FIG. 4, a curve indicated by reference numeral 70 represents a range in which a value of an evaluation function 60 can be taken when printing parameters of print management information applied to calculation of an evaluation value 64 are changed. In other words, the curve indicated by reference numeral 70 represents a prediction curve of the evaluation function 60.

Similar to the first specific example, a function q(x, y, z) corresponding to quality print management information, a function c(x, y, z) corresponding to cost print management information, and a function d(x, y, z) corresponding to delivery print management information in which arbitrary printing parameters x, y, and z are variables are defined. In FIG. 4, the function d(x, y, z) corresponding to the delivery print management information is not shown.

By changing the printing parameters of the print management information applied to the calculation of the evaluation value 64, a value of q(x, y, z), a value of c(x, y, z), and a value of d(x, y, z) for plural printing parameters are calculated.

Further, plural values of F(q, c, d) corresponding to plural values of q(x, y, z), c(x, y, z), and d(x, y, z) are calculated.

In this way, the prediction curve 70 in which the evaluation value 64 shown in FIG. 3 is included is calculated.

Further, a value $F0=F(q_o, c_o)=F(q(x_o, y_o, z_o), c(x_o, y_o, z_o))$ of an evaluation function $F(q, c)$ corresponding to a maximum value 72 of the prediction curve 70 is calculated, and printing parameters $x_o$, $y_o$, and $z_o$ corresponding to the calculated $F_o=F(q(x_o, y_o, z_o), c(x_o, y_o, z_o))$ are calculated.

In the evaluation function $F(q, c, d)$, $d(x_o, y_o, z_o)$ is considered for each calculation of the printing parameters xo, yo, and zo.

The calculated printing parameters $x_o$, printing parameter $y_o$ and printing parameter $z_o$ may be applied to printing conditions after change.

In FIG. 4, an example in which the maximum value 72 of the prediction curve 70 which is equal to or greater than a threshold value $F_t$ is calculated is illustrated, but a case where the maximum value 72 of the prediction curve 70 is smaller than the threshold value Ft may be present. Even in a case where the maximum value 72 of the prediction curve 70 is smaller than the threshold value Ft, enhancement of an evaluation of a printed material during printing is expected by temporarily changing printing conditions based on printing parameters corresponding to the maximum value 72 of the prediction curve 70.

Further, by repeatedly changing the printing conditions plural times, it is possible to expect that the maximum value 72 of the prediction curve 70 which is equal to or greater than the threshold value $F_t$ is calculated. On the other hand, it is preferable that the number of times of printing condition change is regulated and the printing is stopped in a case where the maximum value 72 of the prediction curve 70 is smaller than the threshold value $F_t$ although the printing conditions are changed the regulated number of times.

The printing conditions calculated as described above are transmitted to a printer. If new printing conditions are acquired, the printer applies the new printing conditions to continue printing in execution.

In this example, printing parameters after change are calculated from a value of the evaluation function $F(q, c)$ with respect to the maximum value 72 of the prediction curve 70, but printing parameters after change may be calculated from a value of the evaluation function $F(q, c)$ at an intersection 74 between the prediction curve 70 and the threshold value $F_t$ or an intersection 76 between the prediction curve 70 and the threshold value $F_t$.

In other words, the threshold value $F_t$ is a minimum request allowed in a printed material during printing. By calculating printing parameters in printing conditions after change from the minimum request allowed in the printed material during printing, it is possible to reduce the number of times of printing condition change to a necessary minimum, and to reduce fluctuation in printing due to the printing condition change.

In the above-described print management information change prediction, a case of a two-variable function in which the third term $-W_d \times \log_d$ in Expression (1) is omitted is described, but in the above description, by using a threshold value in which the third term in Expression (1) is considered, the above-described print management information change prediction may be applied to a three-variable function of Expression (1).

In the above-described print management information change prediction, a case where one threshold value $F_t$ is used has been described, but the above-described print management information change prediction may also be applied to a case where the degree of satisfaction relating to print management of a printed material during printing is determined in stages using plural threshold values $F_{t1}$, $F_{t2}$, $F_{t3}$, and so on.

<Printer>

Figure 5:
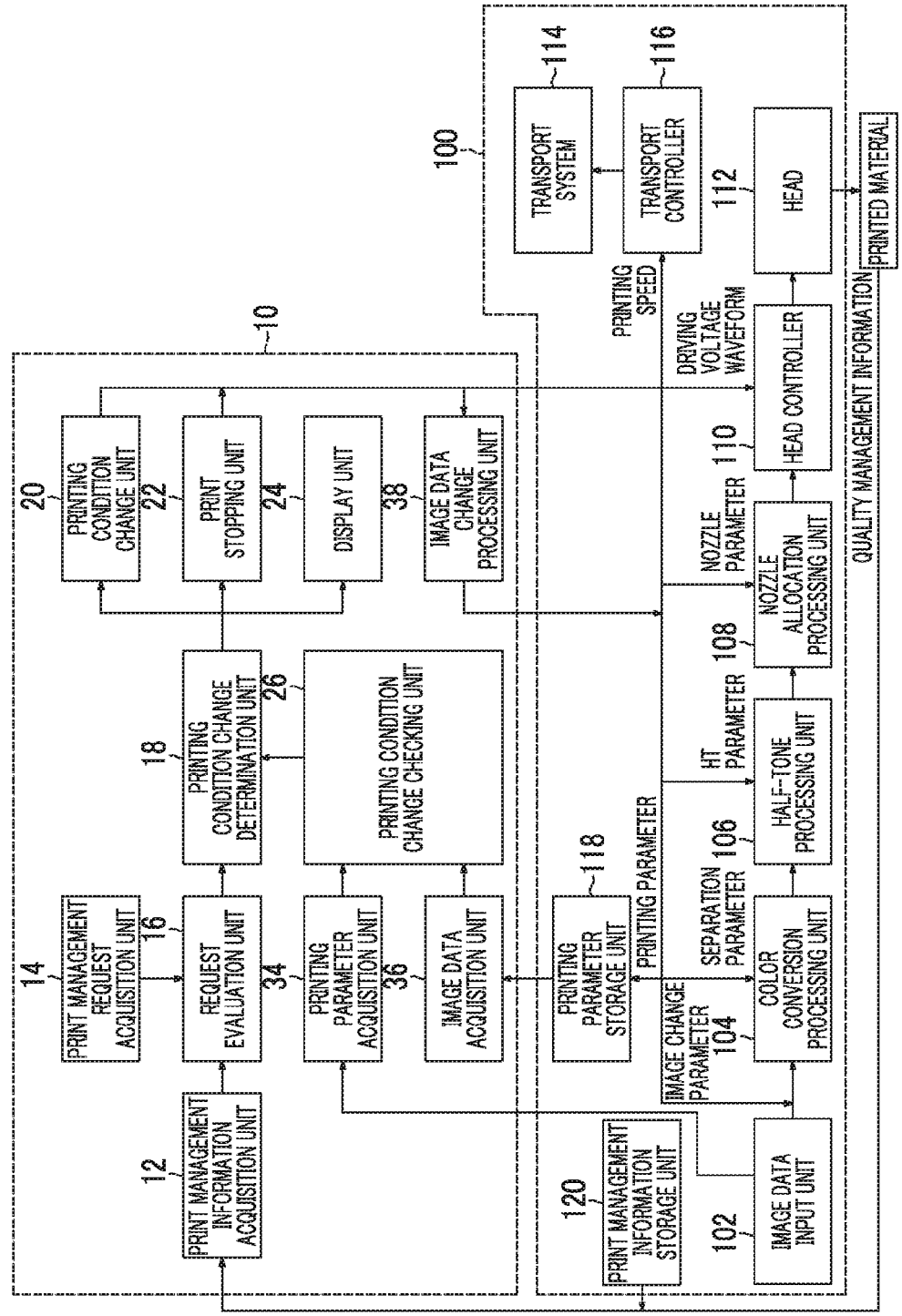
FIG. 5 is a diagram illustrating an overall configuration of a printer.

FIG. 5 is a diagram illustrating an overall configuration of a printer. A printer 100 shown in FIG. 5 manages print management information of a printed material using the printing information management system 10 shown in FIG. 1. In FIG. 5, an ink jet recording device that includes an ink jet type head 112 is shown as the printer.

The printer 100 includes an image data input unit 102, a color conversion processing unit 104, a half-tone processing unit 106, a nozzle allocation processing unit 108, a head controller 110, and the head 112.

The image data input unit 102 acquires image data of a printing target. In a case where image data is changed based on print management information of a printed material during printing, image change parameters corresponding to the image data after change are applied to the image data input unit 102.

As an example of the image data, image data which is RGB 8-bit color data and has a resolution of 350 dots per inch may be used. RGB is an abbreviation of red, green, and blue indicating three primary colors in color representation of additive color mixing.

In a case where image data is changed based on print management information of a printed material during printing, the changed image data is applied to execute printing. In FIGS. 1 and 5, a form in which a image data change processing unit 38 is provided in the printing information management system 10 is shown, but a form in which the image data change processing unit 38 is provided in the printer 100 may be used.

The color conversion processing unit 104 executes a color conversion process of converting color expression based on RGB into CMYK of ink colors, a separation process of generating ink amount data for each color, and a resolution conversion process of converting a resolution. A separation parameter which is a form of printing parameters is applied to the separation process. The CMYK is an abbreviation of cyan, magenta, yellow, and black indicating ink colors applied to the printer 100.

Through the process in the color conversion processing unit 104, image data which is RGB 8-bit color data and has a resolution of 350 dots per inch is converted into image data which is RGB 8-bit color data and has a resolution of 1200 dots per inch.

The half-tone processing unit 106 converts a gradation indicated by 8 bits into a gradation number which is smaller than 8 bits. As an example of image data after half-tone conversion, dot data indicated by 2 bits for each color may be used. The dot data indicated by 2 bits is image data of which gradations are expressed according to three types of dots including a large dot, a medium dot, and a small dot, and non-dot.

The half-tone process may employ a dither method, an error diffusion method, a density pattern method, or the like. The half-tone process may employ a half-tone parameter which is a form of printing parameters. In FIG. 5, the half-tone parameter is written as an HT parameter.

The nozzle allocation processing unit 108 defines a relationship between image data after the half-tone process and plural nozzles provided in the head 112. The nozzle allocation process employs a nozzle parameter which is a form of printing parameters.

The head controller 110 generates a drive voltage waveform supplied to the head 112 based on nozzle-allocated image data and drive waveform. If the drive voltage waveform is supplied to the head, ink is ejected from the nozzles provided in the head 112, and a color image is printed on a printing medium. The head controller 110 employs a drive voltage waveform which is a form of printing parameters.

The head 112 may employ a full-line type head in which nozzles are disposed over a length exceeding a full length of a printing medium in a direction perpendicular to a relative transport direction of the printing medium and the head 112.

The printer 100 that includes the full length type head 112 may perform a single pass type printing for performing printing over the entirety of a client region of a printing medium by relatively moving the head 112 and the printing medium in one direction.

The head 112 may employ a serial type head in which plural nozzles are disposed in the relative transport direction of a printing medium and the head. The printer 100 that includes the serial type head performs scanning in a direction perpendicular to the relative transport direction of the printing medium and the head to perform printing corresponding to one line, and sequentially moves a printing position in the relative transport direction of the printing medium and the head to perform printing corresponding to subsequent lines, to thereby perform a serial type printing for performing printing over the entirety of a client region of the printing medium.

The nozzle configuration of the head 112 may employ a one-row configuration, a two-row staggering configuration, and a matrix configuration. A driving method of the head 112 may employ a piezoelectric type, a thermal type, an electrostatic type, or the like.

The printer 100 includes a transport system 114 and a transport controller 116. The transport system 114 relatively moves a printing medium and the head 112. As an example of the transport system 114, a configuration in which a transport member such as an impression drum that fixes and transports a printing medium or a transport belt, a motor, an actuator or the like, which is a drive source of the transport member are provided may be used.

The transport controller 116 controls an operation of the motor, the actuator, or the like which is the drive source of the transport member to control the start and stop of transport, and a transport speed of a printing medium. With respect to the transport controller 116, a printing speed which is a form of printing parameters may be applied.

A printing parameter storage unit 118 stores printing parameters to be applied to the printer 100. The printing parameters stored in the printing parameter storage unit 118 are read by the printing parameter acquisition unit 34 of the printing information management system 10.

A print management information storage unit 120 stores print management information of the printer 100. As the print management information stored in the print management information storage unit 120, cost print management information and delivery print management information are applied. The print management information stored in the print management information storage unit 120 is read by the print management information acquisition unit 12 of the printing information management system 10.

The printer 100 shown in FIG. 5 may include a system controller that generally controls respective units of the device.

Quality print management information is extracted from a printed material printed by the printer 100. As an extraction example of quality print management information, a printed material may be read using a reading device such as a scanner device, and quality print management information may be extracted from the reading result. The extracted quality print management information is transmitted to the print management information acquisition unit 12 of the printing information management system 10.

In a case where printing conditions are changed, at a timing when it is obviously determined that the printing conditions are changed, it is preferable to notify a printer that the printing conditions are changed. The printer may adjust a printing interval and a printing speed at a timing when it is confirmed that the printing conditions are changed with respect to the printer, to reflect the printing conditions after change in printing as early as possible.

The printer 100 shown in FIG. 5 may be integrally formed with the printing information management system 10. In other words, a printer or a printing system that includes the functions of the printing information management system 10 and the functions of the printer 100 may be formed.

The printer 100 shown in FIG. 5 may include a reading device that reads a printed material. Particularly, by disposing the reading device at a position where the printed material can be read immediately after the printed material is printed, it is possible to reduce a period of time from the time when print management information is acquired from the printed material during printing to the time when the printing information management system 10 acquires the print management information from the printed material during printing.

According to the print management device and the print management method configured as described above, since two or more pieces of print management information including one or more pieces of quality print management information are acquired, it is determined whether a printed material during printing satisfies a request relating to print management, and it is determined whether change in printing conditions of the printed material during printing is necessary, it is possible to execute printing suitable for the request relating to the print management of the printed material during printing.

In this embodiment, an ink jet recording device is shown as an example of a printer, but the invention according to this embodiment may be applied to a printer in which another printing method is applied, such as an electro-photographic type image recording device.

Further, a print management program corresponding to the print management device and the print management method shown in this embodiment may be configured. In other words, a print management program that causes a computer to realize functions of print management information acquisition means corresponding to the print management information acquisition unit 12, print management request acquisition means corresponding to the print management request acquisition unit 14, request evaluation means corresponding to the request evaluation unit 16, and printing condition change determination means corresponding to the printing condition change determination unit 18 may be configured.

In addition, a print management program that causes a computer to realize functions of printing condition change execution means corresponding to the printing condition change execution unit 20, print stopping means corresponding to the print stopping unit 22, display means corresponding to the display unit 24, printing condition change checking means corresponding to the printing condition change checking unit 26, print management information prediction means corresponding to the print management information prediction unit 28, printing condition change rule reference means corresponding to printing condition change rule reference unit 30, and random change means corresponding to the random change unit 32 may be configured.

<Setting of Priority>

Figure 6:
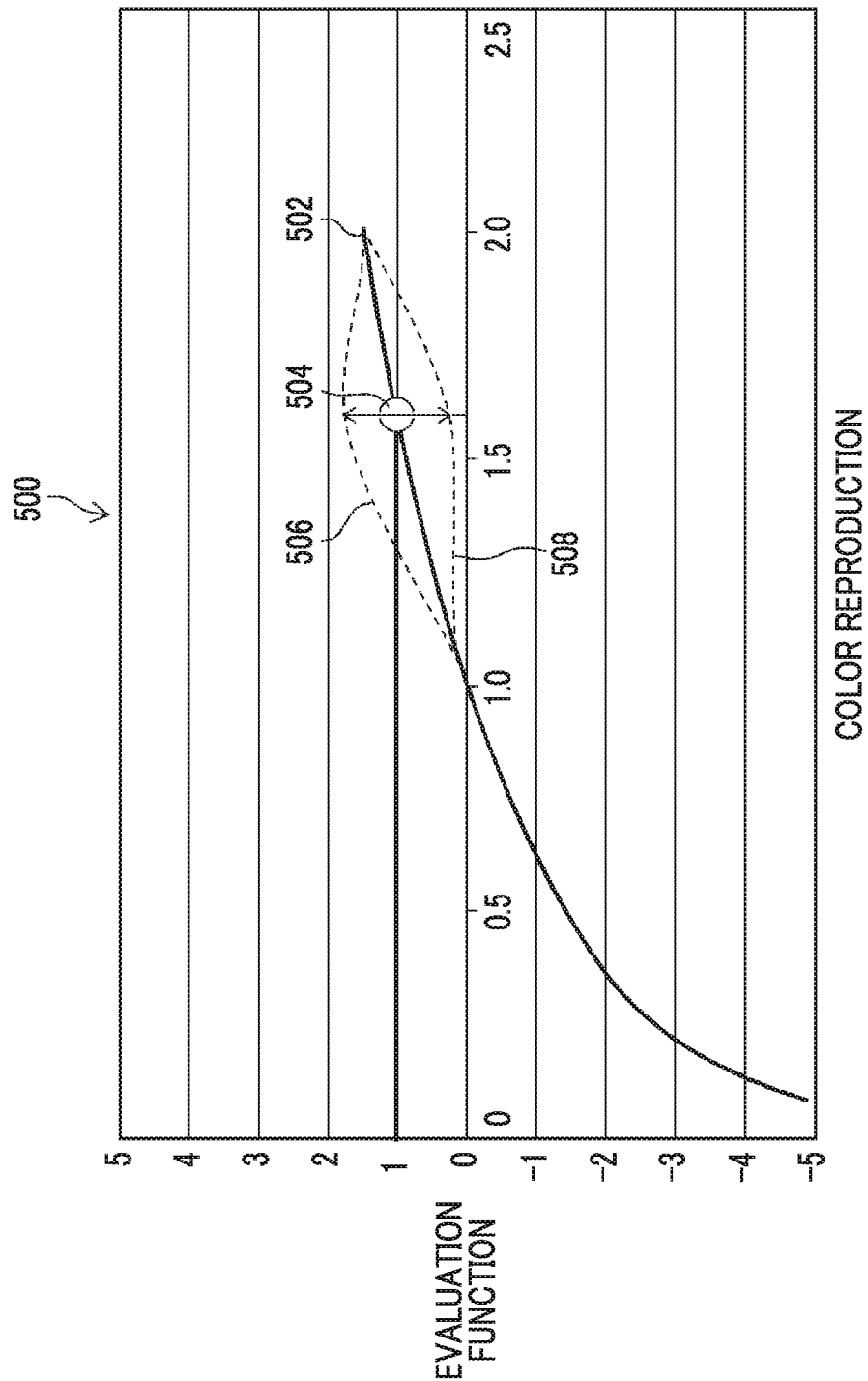
FIG. 6 is a diagram illustrating priority setting.
Figure 7:
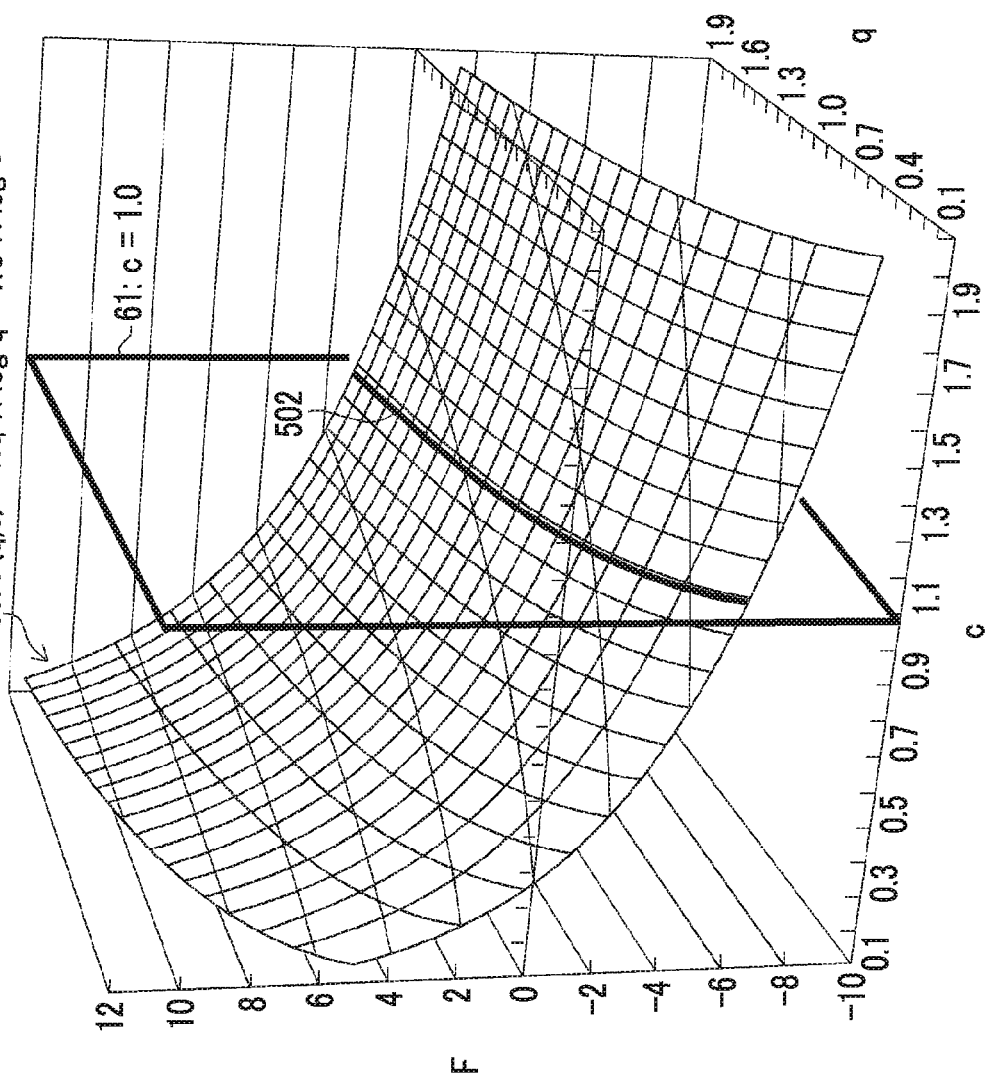
FIG. 7 is a diagram illustrating priority setting.

Setting of a priority of acquired print management information will be described. FIGS. 6 and 7 are diagrams illustrating priority setting. Hereinafter, a case where under the condition that variables other than quality print management information are fixed in the evaluation function 60 shown in FIGS. 3 and 4, adjustment of the quality print management information and an evaluation function is performed will be described. In this example, color reproduction is shown as an example of quality management information.

An evaluation function 502 displayed on a priority setting screen 500 shown in FIG. 6 is obtained by fixing cost print management information of the evaluation function 60 shown in FIGS. 3 and 4 to 1.0. FIG. 7 shows a surface 61 in which cost print management information in the evaluation function 60 shown in FIGS. 3 and 4 is 1.0, and the evaluation function 502 on the surface 61. The numerical value 1.0 of the cost print management information is an example for ease of description, and does not limit the invention according to this embodiment.

A transverse direction in FIG. 6 represents color reproduction. A longitudinal direction in FIG. 6 represents an evaluation function. If a value of the evaluation function 502 given reference numeral 504 increases, the evaluation function 502 is adjusted to an evaluation function 506 indicated by a broken line. If the value of the evaluation function 502 given reference numeral 504 decreases, the evaluation function 502 is adjusted to an evaluation function 508 indicated by a broken line.

In this way, by adjusting the evaluation function in Expression (1), it is possible to selectively set a priority.

FIG. 8 is a diagram illustrating a setting confirmation screen. A setting confirmation screen 510 shown in FIG. 8 displays a value of the evaluation function 502 and values of variables of the evaluation function 502 shown in FIG. 6. The setting confirmation screen 510 shown in FIG. 8 shows an example in which display forms of a value of color reproduction which is a noticed variable and the value of the evaluation function value are changed from original display forms.

As shown in FIG. 8, the value of the evaluation function 502 and the values of the variables of the evaluation function after adjustment may be displayed on the priority setting screen 500. The variables of the evaluation function shown in FIG. 8 are shown as an example, and does not limit the invention according to this embodiment.

Figure 9:
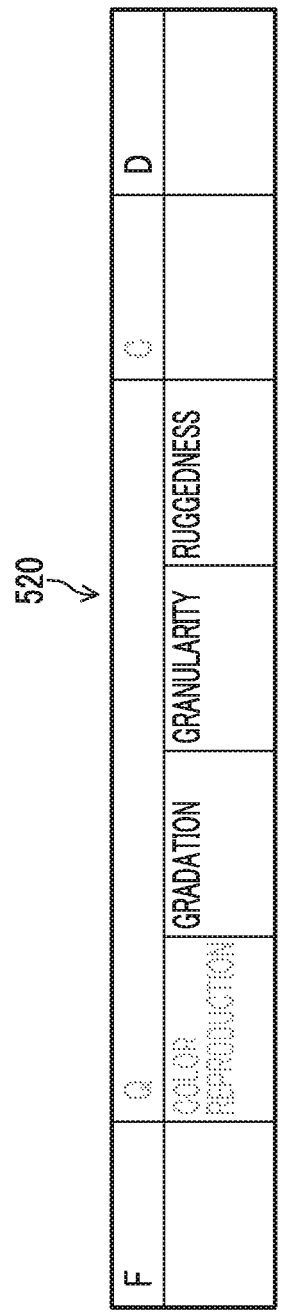
FIG. 9 is a diagram illustrating another example of priority setting.

FIG. 9 is a diagram illustrating another example of priority setting. FIG. 9 shows a select screen 520 for selecting two variables from plural variables of the evaluation function F in Expression (1). The select screen 520 shown in FIG. 9 shows an example n which color reproduction and cost are selected.

In this way, by selecting two variables from the variables of the evaluation function F in Expression (1), it is possible to display the evaluation function 60 shown in FIG. 3, and to confirm the value of the evaluation function 60.

In FIG. 9, the select screen 520 for selecting two variables from the plural variables of the evaluation function F in Expression (1) is shown for ease of description and illustration, but one variable may be selected, or three or more variables may be selected. Further, FIG. 9 and the quality print management information shown in FIG. 9 are only examples, and do not limit the invention according to this embodiment.

<Other Examples of Print Management Information>

Figure 10:
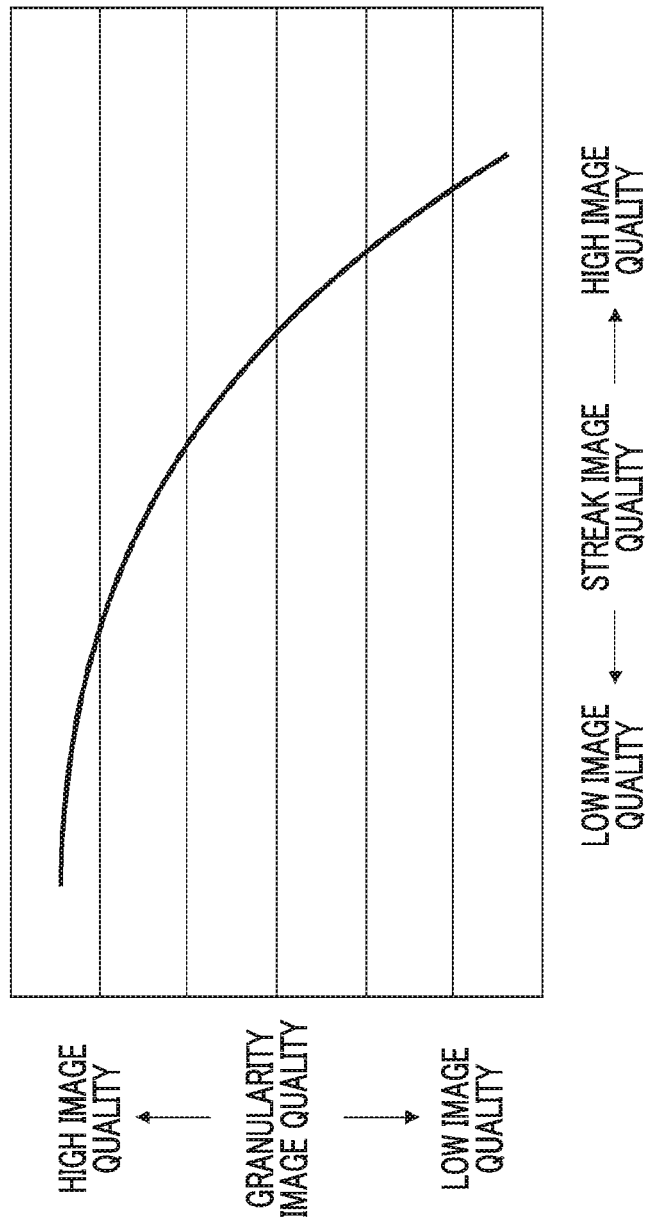
FIG. 10 is a diagram schematically illustrating a relationship between an evaluation of a streak image quality and an evaluation of a granularity image quality to be applied to print management information.

Next, other examples of print management information will be described in detail. FIG. 10 is a diagram schematically illustrating a relationship between an evaluation of a streak image quality and an evaluation of a granularity image quality to be applied to quality print management information.

A transverse direction in FIG. 10 represents an evaluation of a streak image quality. As it goes to the right in FIG. 10, it means that a streak is not noticeable and an evaluation of a streak image quality becomes higher, in other words, that the evaluation of the streak image quality becomes better. As it goes to the left in FIG. 10, it means that a streak is easily noticed and an evaluation of a streak image quality becomes lower, in other words, that the evaluation of the streak image quality becomes worse.

A longitudinal direction in FIG. 10 represents an evaluation of a granularity image quality. As it goes to the top in FIG. 10, it means that a granularity is not noticeable and an evaluation of a granularity image quality becomes higher, in other words, that the evaluation of the granularity image quality becomes better. As it goes to the bottom in FIG. 10, it means that a granularity is easily noticed and an evaluation of a granularity image quality becomes lower, in other words, that the evaluation of the granularity image quality becomes worse.

As shown in FIG. 10, if a streak is not noticeable, a granularity is easily noticeable, and if a granularity is not noticeable, a streak is easily noticeable. In this way, in a case where two evaluation indexes having a trade-off relationship are included in quality print management information, Expression (8) obtained by modifying the evaluation function F(q, c, d) in Expression (1) is applied.

$$F(q, c, d) = W_q \times (\log q_1 - \log q_2) - W_c \times \log c - W_d \times \log d \quad (8)$$

In a case where Expression (8) includes three or more variables as quality print management information, the first term in Expression (8) may be modified into $W_q \times (\log q_1 - \log q_2 + \log q_3 + \ldots)$. A sign of the first term is determined so that when at least one variable among plural variables is used as a reference, a sign of a variable indicating an evaluation index having a trade-off relationship with an evaluation index indicated by the reference variable is negative and a sign of a variable indicating an evaluation index having a non-trade-off relationship with the evaluation index indicated by the reference variable is positive.

Figure 11:
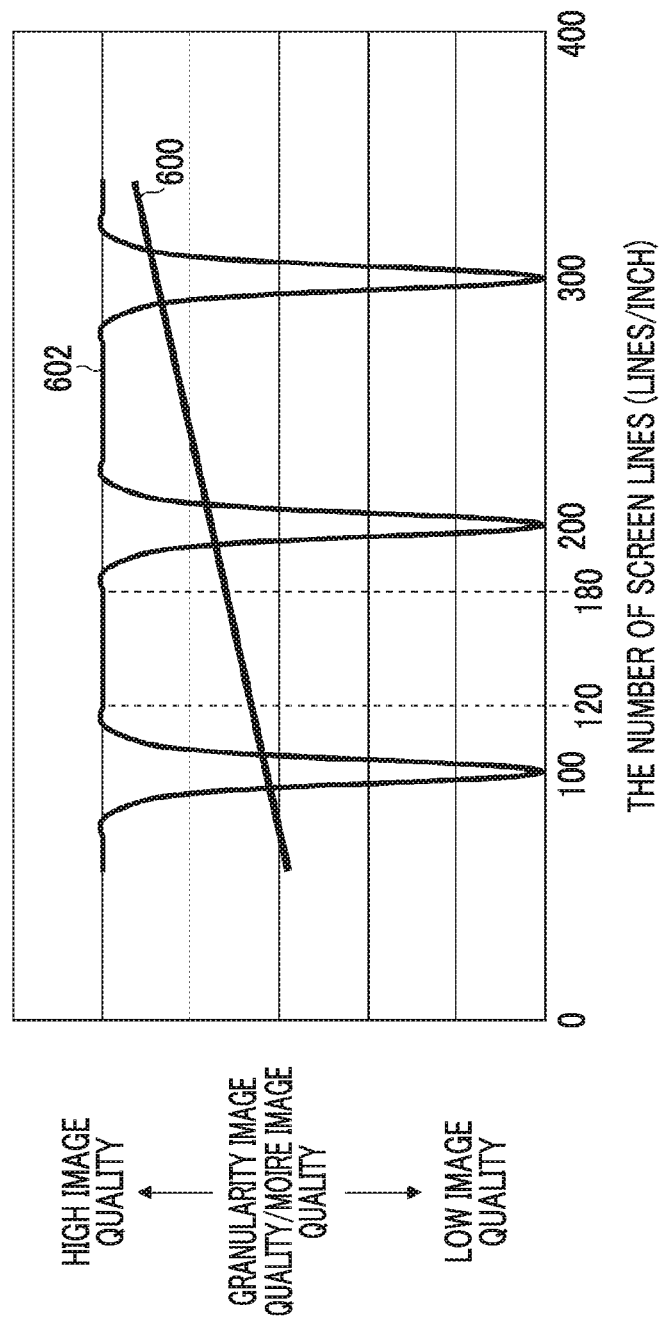
FIG. 11 is a diagram schematically illustrating a relationship between the number of screen lines and an evaluation of a granularity image quality, and a relationship between the number of screen lines and a moire image quality.

FIG. 11 is a diagram schematically illustrating a relationship (reference numeral 600) between the number of screen lines and an evaluation of a granularity image quality, and a relationship (reference numeral 602) between the number of screen lines and a moire image quality. The number of screen lines refers to the number of lines per unit length, in which the unit is the number of lines per inch. The number of screen lines is the same quality evaluation index as a resolution shown as quality print management information.

A transverse direction in FIG. 11 represents the number of screen lines. A longitudinal direction in FIG. 11 represents an evaluation of a granularity image quality or an evaluation of a moire image quality. As it goes to the top in FIG. 11, it means that a granularity or moire is not noticeable and an evaluation of a granularity image quality or an evaluation of a moire image quality becomes higher, in other words, that the evaluation of the granularity image quality or the evaluation of the moire image quality becomes better. As it goes to the bottom in FIG. 11, it means that a granularity or a moire is easily noticed and an evaluation of a granularity image quality or an evaluation of a moire image quality becomes lower, in other words, that the evaluation of the granularity image quality or the evaluation of the moire image quality becomes worse.

If the number of screen lines becomes larger, a quality evaluation becomes higher, in a similar way to a case where a resolution becomes higher. On the other hand, if the number of screen lines becomes smaller, the quality evaluation becomes lower. A relationship between the number of screen lines and the granularity image quality is made such that if the number of screen lines becomes larger, the granularity is less easily visually recognized, and the evaluation of the granularity image quality becomes higher. If the number of screen lines becomes smaller, the granularity is easily visually recognized, and the evaluation of the granularity image quality becomes lower.

In this way, there is a case where two quality evaluation indexes to be applied as quality print management information have a non-trade-off relationship. In such a case, the first term in Expression (8) is modified into $W_q \times (\log q_1 + \log q_2)$.

In the evaluation of the moire image quality, a high quality or a low quality is discrete with respect to the number of screen lines. In such a case, values of the number of screen lines are sectioned, and the first term in Expression (8) is modified for each section.

In the example shown in FIG. 11, when qi in Expression (8) represents the number of screen lines and $q_2$ represents the moire image quality, in a case where the number of screen lines is equal to or greater than 100 lines/inch and equal to or smaller than 120 lines/inch, the first term in Expression (8) is modified into $W_q \times (\log q_1 + \log q_2)$.

In a case where the number of screen lines is larger than 180 lines/inch and is smaller than 200 lines/inch, the first term in Expression (8) is modified into $W_q \times (\log q_1 - \log q_2)$. In a case where the number of screen lines is larger than 120 lines/inch and is smaller than 180 lines/inch, the first term in Expression (8) is modified into $-\log q_2$.

In this way, by appropriately modifying Expression (8) according to a correlation of plural pieces of quality print management information which are plural variables in Expression (8), it is possible to handle all combinations of quality print management information. Further, it is possible to prepare evaluation functions corresponding to all combinations of quality print management information.

Figure 12:
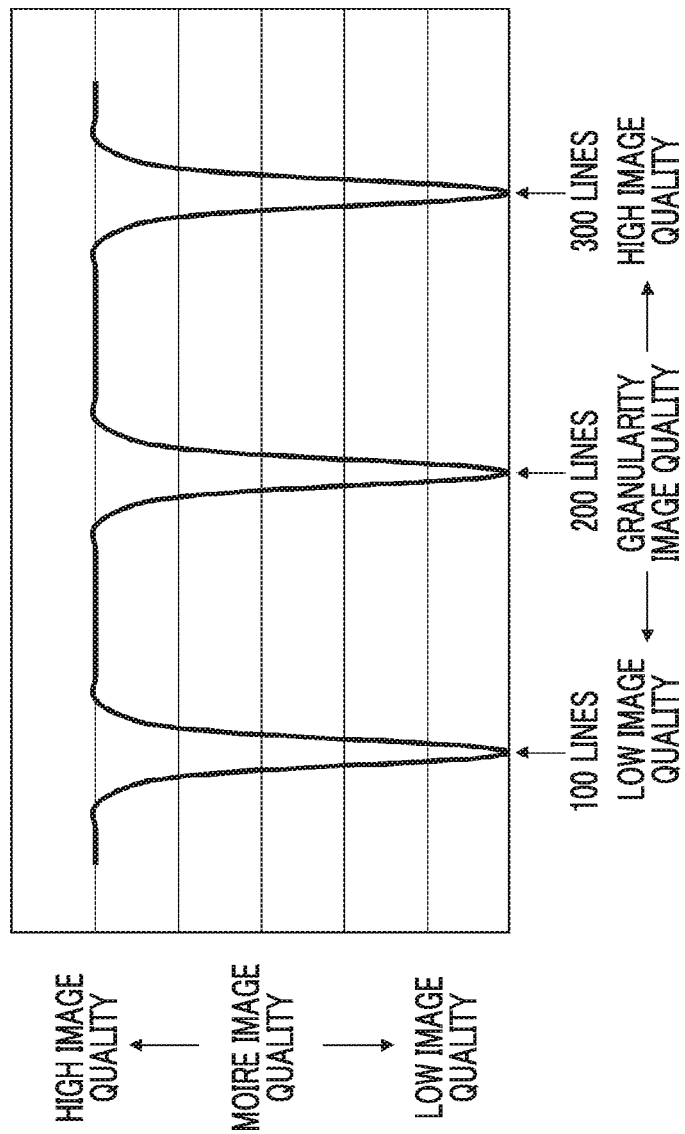
FIG. 12 is a diagram illustrating a relationship between an evaluation of a granularity image quality and an evaluation of a moire image quality when the number of screen lines changes.

FIG. 12 is a diagram illustrating a relationship between an evaluation of a granularity image quality and an evaluation of a moire image quality when the number of screen lines is changed. A transverse direction in FIG. 12 represents an evaluation of a granularity image quality. As it goes to the right in FIG. 12, it means that a granularity is not noticeable and an evaluation of a granularity image quality becomes higher, in other words, that the evaluation of the granularity image quality becomes better. As it goes to the left in FIG. 12, it means that a granularity is easily noticed and an evaluation of a granularity image quality becomes lower, in other words, that the evaluation of the granularity image quality becomes worse.

A longitudinal direction in FIG. 12 represents an evaluation of a moire image quality. As it goes to the top in FIG. 12, it means that a moire is not noticeable and an evaluation of a moire image quality becomes higher, in other words, that the evaluation of the moire image quality becomes better. As it goes to the bottom in FIG. 12, it means that a moire is easily noticed and an evaluation of a moire image quality becomes lower, in other words, that the evaluation of the moire image quality becomes worse.

The evaluation of the granular image quality and the evaluation of the moire image quality have periodicity depending on the number of screen lines. In this case, similarly, evaluations of the number of screen lines and granularity image quality are divided, and Expression (8) is deformed for each division. A modification procedure in Expression (8) is the same as in the case of the evaluations of the number of screen lines and the moire image quality, and description thereof will not be repeated.

Figure 13:
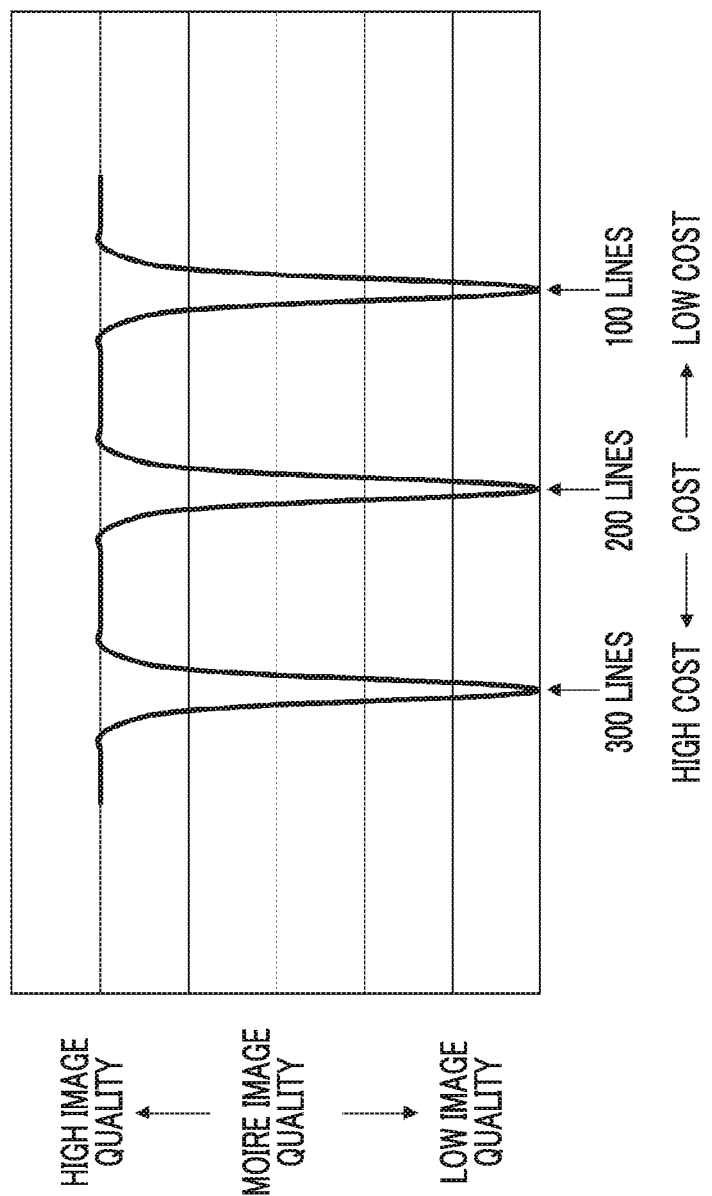
FIG. 13 is a diagram illustrating a relationship between an evaluation of cost and an evaluation of a moire image quality.

FIG. 13 is a diagram illustrating a relationship between an evaluation of cost and an evaluation of a moire image quality. A transverse direction in FIG. 13 represents an evaluation of cost. As it goes to the right in FIG. 13, it means that an evaluation of cost becomes higher, in other words, that the evaluation of the cost becomes worse. As it goes to the right in FIG. 13, it means that an evaluation of cost becomes lower, in other words, that the evaluation of the cost becomes better.

Since there may be a non-trade-off relationship between quality print management information and cost print management information, with respect to a sign of the second term in Expression (1) and a sign of the second term in Expression (1), the sign is negative in the case of a trade-off relationship with the first term, and is positive in the case of a non-trade-off relationship with the first term.

Further, in a case where plural pieces of cost print management information are included as cost print management information, the second term in Expression (1) is modified into $W_c \times (\log c_1 + \log c_2 + \ldots )$. Positivity or negativity of signs is appropriately set based on a correlation of the pieces of cost print management information.

Similarly, in a case where plural pieces of delivery print management information are included as delivery print management information, the third term in Expression (1 is modified into $W_d \times (\log d_1 + \log d_2 + \ldots )$. Positivity or negativity of signs is appropriately set based on a correlation of the pieces of delivery print management information.

In brief, Expression (1 may be modified into Expression (9).

$$F(q, c, d) = W_q \times (\log q_1 + \log q_2 + \ldots ) + W_c \times (\log c_1 + \log c_2 + \ldots ) + W_d \times (\log d_1 + \log d_2 + \ldots ) \qquad (9)$$

Further, if a weight for each variable in each term is changed and constants $W_q$, $W_c$, and $W_d$ in Expression (9) are changed for each variable, Expression (9) may be modified into Expression (10).

$$F(q, c, d) = (W_{q1} \times \log q_1 + W_{q2} \log q_2 + \ldots ) + (W_{c1} \times \log c_1 + W_{c2} \log c_2 + \ldots ) + (W_{d1} \times \log d_1 + W_{d2} \log d_2 + \ldots ) \qquad (10)$$

Positivity or negativity of a sign of each term is set such that when any one of plural pieces of print management information in Expression (9) and Expression (10) is a reference, the sign is positive in the case of a trade-off relationship with the reference and is negative in the case of a non-trade-off relationship with the reference.

In other words, in the evaluation functions shown in Expression (1), Expression (8), Expression (9), and Expression (10), terms of variables having a trade-off relationship have different signs. In the evaluation functions in Expression (1) and the like, terms of variables having a non-trade-off relationship have the same signs.

In both cases, that is, in a case where the relationship between variables to be applied to an evaluation function is a trade-off relationship and in a case where the relationship is a non-trade-off relationship, it is possible to generally evaluate an evaluation value of a printed material based on first information and an evaluation value of the printed material based on second information.

In Expression (8), Expression (9), and Expression (10), the evaluation functions F have a natural logarithm form in consideration of the fact that a case where variables q, c, and d are all zero is not present, but the evaluation functions shown in Expression (8), Expression (9), and Expression (10) are only examples, and evaluation functions of various forms in which q, c, and d are variables may be applied.

By using Expression (9) and Expression (10), it is possible to evaluate print management information using an evaluation function F(q, c, d) with respect to various combinations of print management information. In other words, it is possible to evaluate a printed material during printing based on plural evaluation indexes in quality, evaluation indexes of quality and cost, evaluation indexes of quality and delivery, or evaluation indexes of quality, cost, and delivery, and to perform optimal printing based on many-sided evaluations from plural viewpoints.

The above-described print management device, print management method, and print management program may include appropriate modifications, additions, and omissions in a range without departing from the concept of the invention.

Second Embodiment: Overall Configuration of Print Management Device

Next, a print management device, a print management method, and a print management program according to a second embodiment of the invention will be described. The same reference numerals are given to the same or similar portions as in the second embodiment described above, and description thereof will not be repeated.

Figure 14:
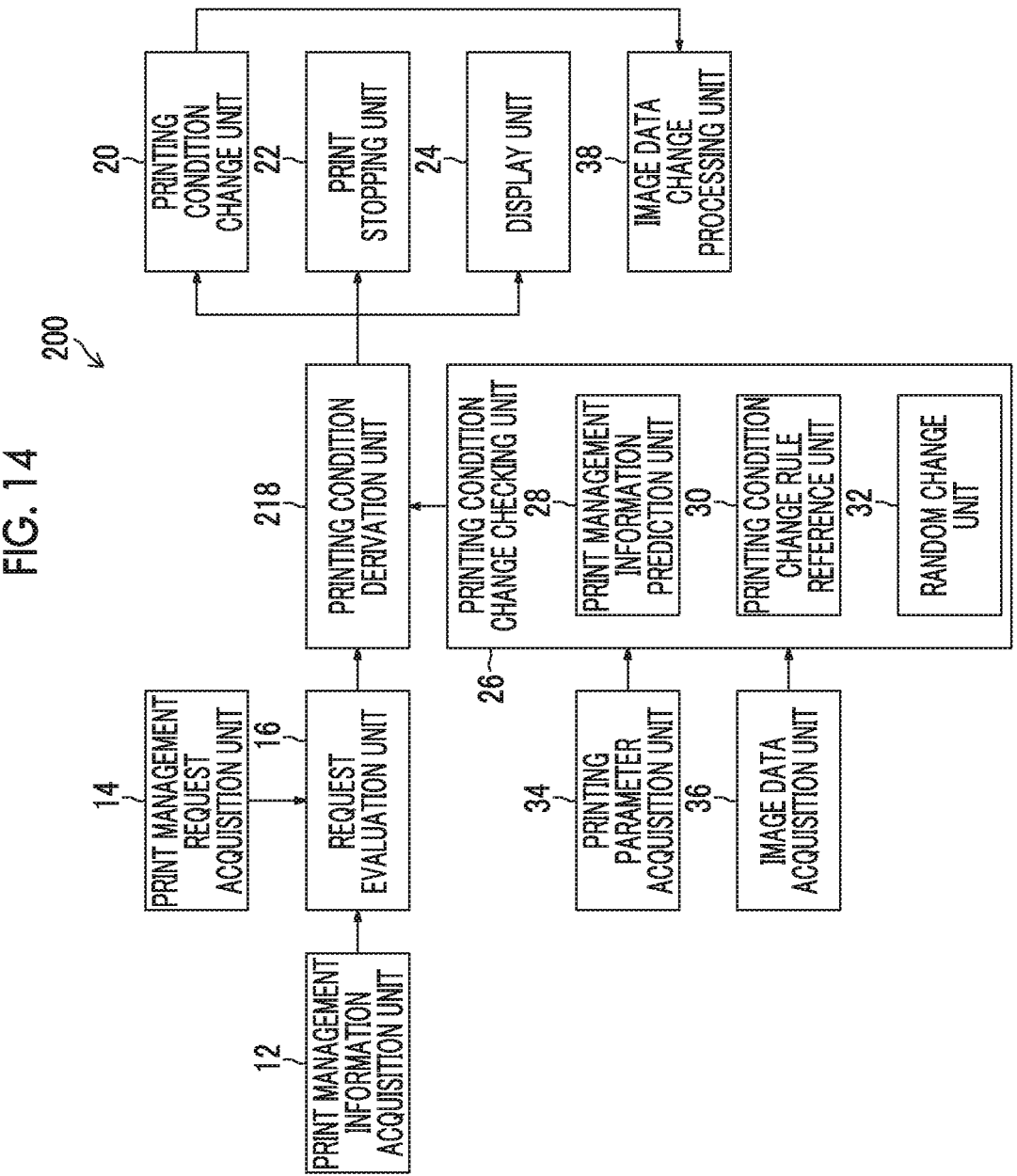
FIG. 14 is a diagram illustrating an overall configuration of a printing information management system according to a second embodiment of the invention.

FIG. 14 is a diagram illustrating an overall configuration of the printing information management system according to the second embodiment of the invention. A printing information management system 200 shown in FIG. 14 includes a print management information acquisition unit 12, a print management request acquisition unit 14, a request evaluation unit 16, and a printing condition derivation unit 218.

The print management information acquisition unit 12 acquires print management information. The print management information acquisition unit 12 is the same as in the first embodiment, and description thereof will not be repeated.

Request information acquired by the print management request acquisition unit 14 includes priority information indicating a priority of print management information used in evaluation of a printed material using print management information. With respect to the priority of the print management information, the evaluation function expressed as Expression (1) or the evaluation function expressed as Expression (10) may be applied. One or more threshold values may be acquired as the request information.

The request evaluation unit 16 evaluates the degree of satisfaction for print management information of a printed material during printing based on the print management information acquired by the print management information acquisition unit 12 and the request information acquired by the print management request acquisition unit 14.

The printing condition derivation unit 218 derives printing conditions for relatively increasing the degree of satisfaction for a request relating to print management indicated by the acquired request information, based on the evaluation result for the printed material during printing in the request evaluation unit 16.

In other words, in the print management device according to this embodiment, in terms of whether printing conditions for enhancing an evaluation of a printed material during printing can be derived, the degree of satisfaction for a request relating to print management indicated by request information for the printed material during printing is evaluated.

In a case where one or more threshold values are acquired as request information, in terms of whether printing conditions in which an evaluation value is equal to or greater than each threshold value can be derived, the degree of satisfaction for a request relating to print management indicated by request information for a printed material during printing is evaluated.

The printing condition change execution unit 20 executes change in printing conditions based on the printing conditions derived in the printing condition derivation unit 218. If the printing conditions are changed, information indicating that the printing conditions are changed is displayed on the display unit 24. The printing conditions after change may be displayed on the display unit 24.

The print stopping unit 22 executes stop of printing. As a case where printing is stopped, there is a case where printing conditions for relatively increasing the degree of satisfaction for a request relating to print management indicated by request information cannot be derived in the printing condition derivation unit 218. As another case where printing is stopped, there is a case where there is an instruction for stopping printing. In a case where the stop of printing is executed, information indicating that the stop of printing is executed may be displayed on the display unit 24.

In a case where printing conditions are not derived, printing may be continued without changing the printing conditions. That is, in a case where the printing conditions are not derived, printing conditions before change may be considered as printing conditions after change. In a case where printing is continued without changing the printing conditions, information indicating that the printing is continued without changing the printing conditions may be displayed on the display unit 24.

The printing condition derivation unit 218 may have a function of a printing condition derivation determination unit that determines, in a case where printing conditions are not derived, whether printing is to be stopped or to be continued without changing the printing conditions.

The printing condition derivation unit 218 includes a print management information prediction unit 28, a printing condition change rule reference unit 30, and a random change unit 32. The print management information prediction unit 28 predicts, when printing conditions are changed, change in print management information in printing conditions after change with respect to print management information in printing conditions before change. Details about the print management information change prediction will be described later.

The printing condition change rule reference unit 30 derives, when printing conditions are changed, printing conditions after change with reference to a predetermined printing condition change rule.

The random change unit 32 checks, when printing conditions are changed, printing conditions using a method other than checking of printing conditions using print management information change prediction and checking of printing conditions with reference to a printing condition change rule.

Configurations and functions of the printing parameter acquisition unit 34, the image data acquisition unit 36, and the image data change processing unit 38 shown in FIG. 14 are the same as in the first embodiment, and detailed description thereof will not be repeated.

<Print Information Management Method>

Figure 15:
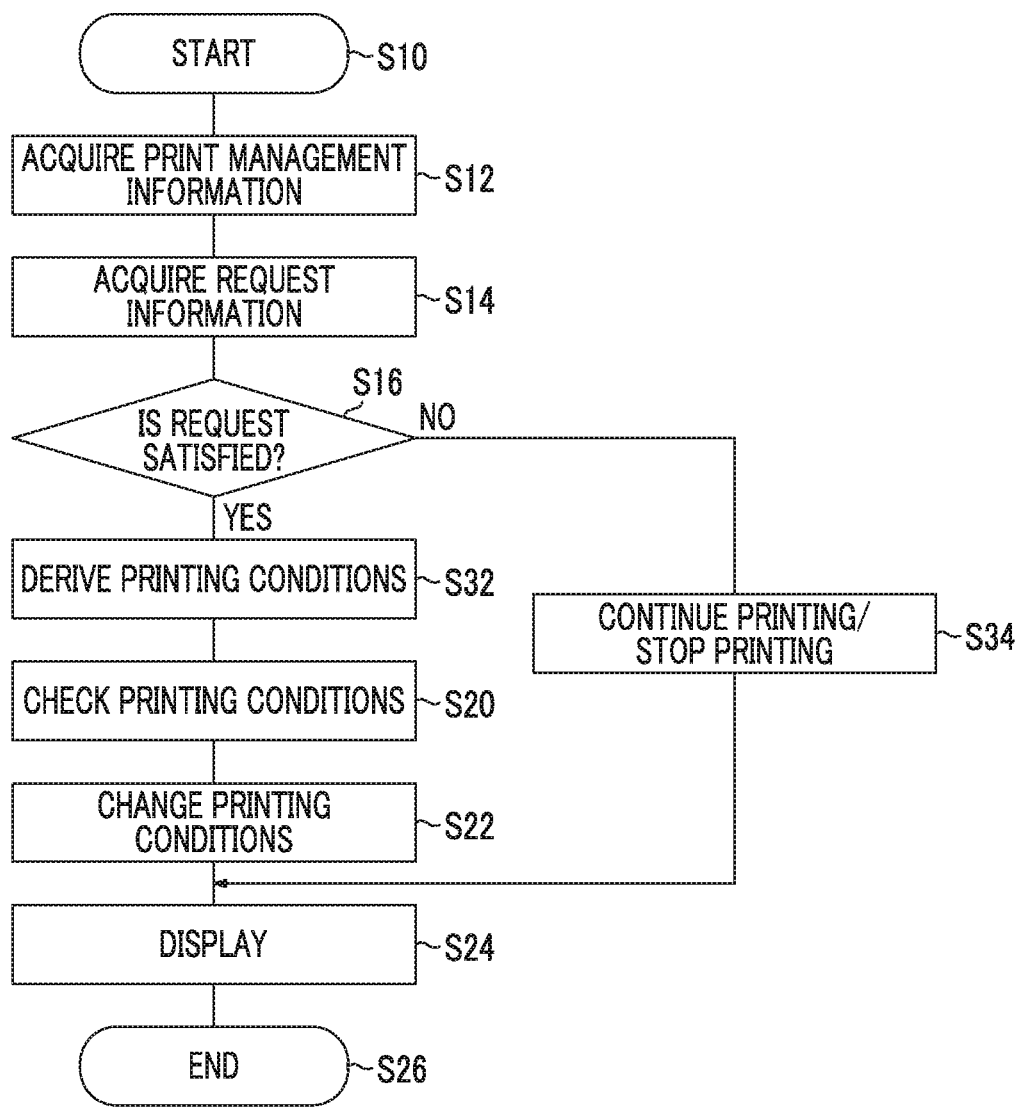
FIG. 15 is a flowchart illustrating a control flow of a printing information management method according to the second embodiment of the invention.

FIG. 15 is a flowchart illustrating a control flow of a printing information management method according to the second embodiment of the invention. In the following description, description about the same processes as in the print information management method according to the first embodiment described using FIG. 2 will be appropriately omitted.

A starting process S10 and a print management information acquisition process S12 are the same as in the first embodiment, and description thereof will not be repeated. In a print management request acquisition process S14, request information is acquired. The request information includes priority information indicating a priority of print management information used in evaluation of a printed material using print management information. In a request evaluation process S16, the degree of satisfaction for a request relating to print management indicated by request information of a printed material during printing is evaluated.

In the request evaluation process S16, in a case where the determination is YES, that is, in a case where the degree of satisfaction for the request relating to the print management indicated by the request information is evaluated and printing conditions for relatively increasing an evaluation of a printed material can be derived, the procedure proceeds to a printing condition derivation process S32. In the printing condition derivation process S32, the printing conditions for relatively increasing the degree of satisfaction for the request relating to the print management indicated by the request information are derived, and the procedure proceeds to a printing condition checking process S20.

In the printing condition checking process S20, change in print management information in the derived printing conditions is predicted, and the procedure proceeds to a printing condition change execution process S22.

In the printing condition change execution process S22, change to the printing conditions derived in the printing condition derivation process S32 is executed. After the change of the printing conditions are executed, the procedure proceeds to an end process S26 through a display process S24, and then, a process of terminating the control of the print information management method is executed.

In the request evaluation process S16, in a case where the determination is NO, that is, in a case where the printing conditions are not derived, in a printing continuing or stopping process (not shown), a process of stopping printing or continuing printing without changing the printing condition is executed (S34).

Then, the procedure proceeds to the end process S26 through the display process S24, and then, the process of terminating the control of the print information management method is executed.

<Print Management Information Change Prediction>

Figure 16:
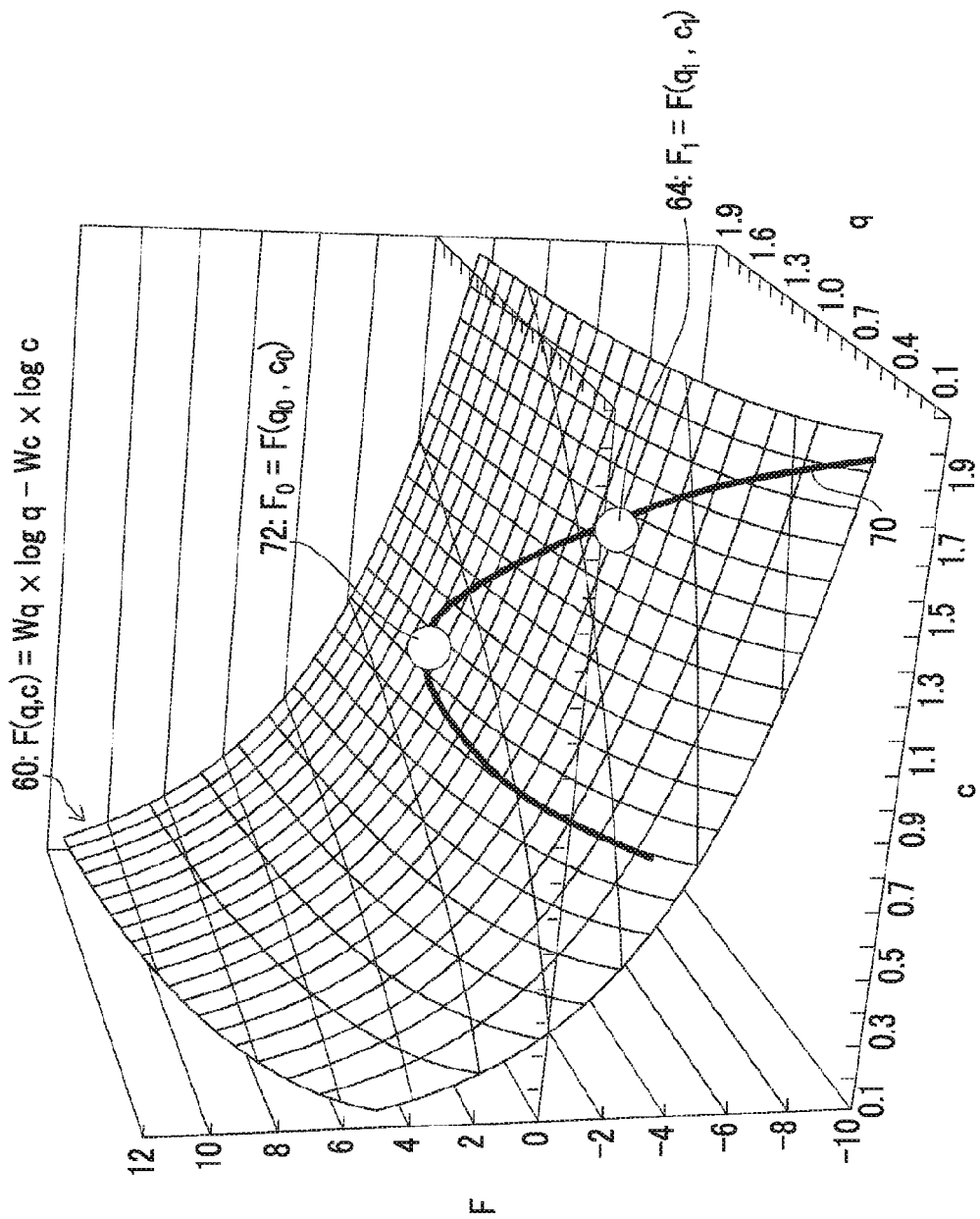
FIG. 16 is a diagram illustrating change prediction of print management information.

FIG. 16 is a diagram illustrating print management information change prediction. In FIG. 16, the same numerical values are given to the same or similar portions as in FIG. 3 or 4, and description thereof will be appropriately omitted.

If a prediction curve 70 is predicted in the print management information prediction unit 28 shown in FIG. 14, a maximum value 72 of the prediction curve 70 is calculated, and printing parameters corresponding to the maximum value is calculated from the maximum value 72.

The prediction curve 70 shown in FIG. 16 may be predicted using the same method and procedure as in the prediction curve 70 shown in FIG. 4. Further, a method for calculating, from the maximum value 72, printing parameters corresponding to the maximum value may employ the above-described method.

There may be a case where a prediction curve that does not have a maximum value is predicted according to combinations of pieces of print management information. In a case where a maximum value cannot be calculated from a prediction curve, such as a case where a prediction curve that does not have a maximum value is predicted, a largest value of a change prediction function may be calculated, and printing parameters corresponding to the largest value may be calculated from the largest value.

In this embodiment, similarly, printing parameters corresponding to a minimum request allowed in a printed material during printing may be calculated. The minimum request in this embodiment refers to a minimum request for relatively increasing the degree of satisfaction for a request relating to print management indicated by request information. For example, in the prediction curve 70 in FIG. 16, a request for relatively reducing a difference between an evaluation value and a maximum value may be made.

As another example of the minimum request, in a case where a printed material during printing is evaluated using a threshold value, a request for making an evaluation value of a printed material equal to or greater than a threshold value may be the minimum request. In a case where a printed material is evaluated using plural threshold values, a request equal to or greater than a threshold value having a smallest difference with an evaluation value may be the minimum request. An evaluation of a printed material using a threshold value $F_t$ is schematically shown in FIG. 4.

In a form in which a printed material is evaluated using the threshold value $F_t$, in a case where an evaluation of the printed material is equal to or greater than the threshold value, it may be determined whether the evaluation of the printed material can be further enhanced by predicting change in print management information. Such a form corresponds to the request evaluation process S16 and the evaluation enhancement determination process S30 in FIG. 2.

The printing parameters calculated in this way may be immediately applied as printing parameters of a printer.

In other words, in a case where it is possible to relatively increase the degree of satisfaction for a request relating to print management indicated by request information without determining the necessity of changing printing conditions, by immediately checking printing conditions for enhancing an evaluation of a printed material during printing and changing the printing conditions, it is possible to quickly handle fluctuation in a printing situation.

Although not described, the print management information change prediction described in the first embodiment may be applied to this embodiment. In other words, as the print management information change prediction in this embodiment, a first specific example of the print management information change prediction may be applied, or a second specific example of the print management information change prediction may be applied.

<Printer>

Figure 17:
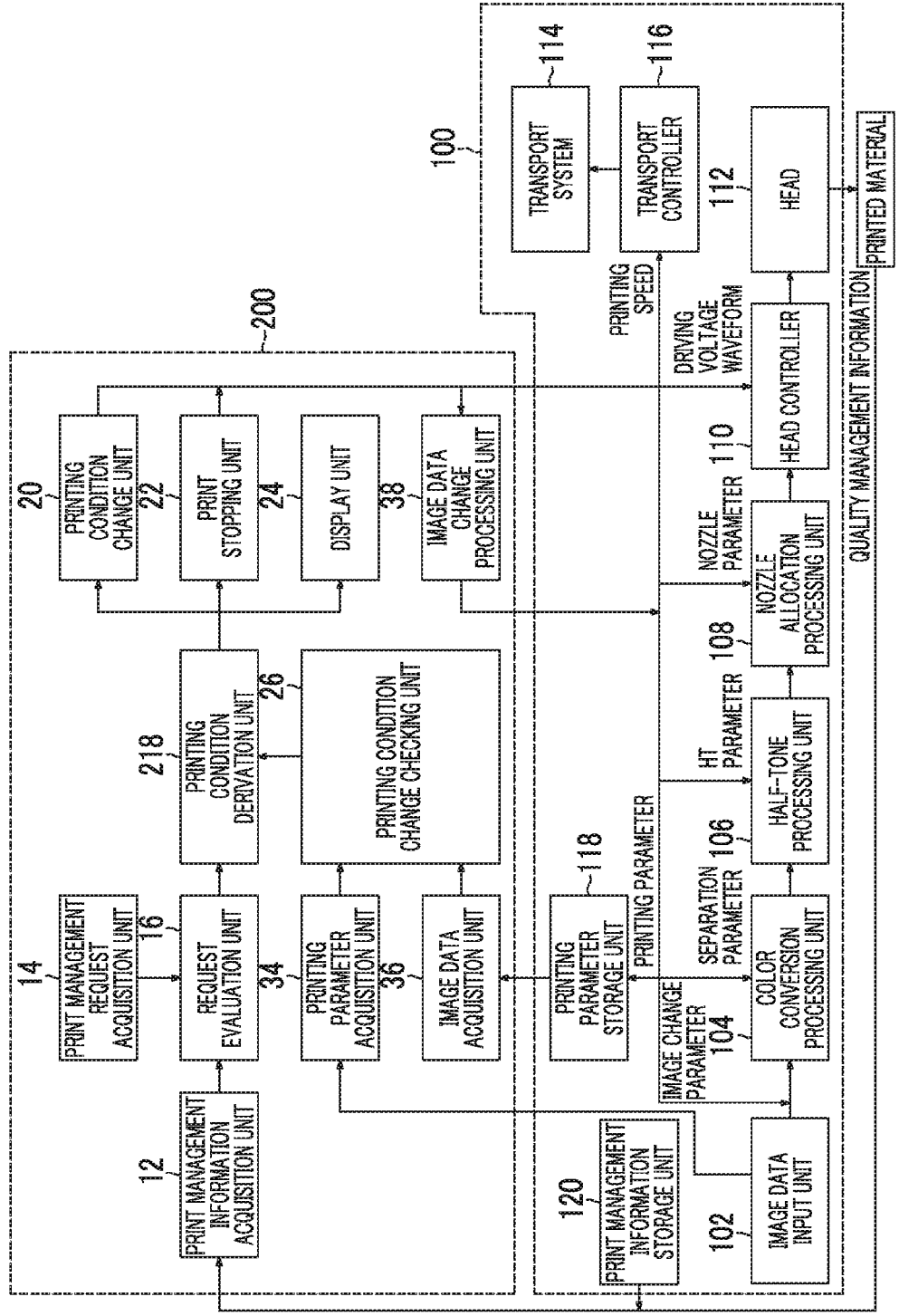
FIG. 17 is a diagram illustrating an overall configuration of a printer.

FIG. 17 is a diagram illustrating an overall configuration of a printer. In FIG. 17, the same reference numerals are given to the same or similar portions as in FIG. 5, and description thereof will be appropriately omitted. A printer 100 shown in FIG. 17 may employ a configuration of the printer 100 in FIG. 5.

Further, the printer 100 shown in FIG. 17 may be integrally formed with a printing information management system 200.

As means corresponding to respective units of the printing information management system shown in FIGS. 14 and 17, a print information management program for causing a computer to function may be configured. For example, a program for causing a computer to function as print management information acquisition means corresponding to the print management information acquisition unit 12, print management request acquisition means corresponding to the print management request acquisition unit 14, request evaluation means corresponding to the request evaluation unit 16, and printing condition derivation means that functions as the printing condition derivation unit 218 may configured. The above-described print management program is recorded on a non-transitory computer-readable tangible medium such as a flash memory.

The print management information applied to the print management device, the print management method, and the print management program according to the second embodiment may employ print management conditions applied to the print management device, the print management method, and the print management program according to the first embodiment.

The print management information applied to the print management device, the print management method, and the print management program according to the second embodiment may employ printing conditions, printing parameters, image data, and modifications thereof applied to the print management device, the print management method, and the print management program according to the first embodiment.

The above-described print management device, print management method and print management program may include appropriate modifications, additions, or omissions in a range without departing from the concept of the invention. Furthermore, the above-described embodiments may be appropriately combined.

What is claimed is:

1. A print management device comprising:
a print management information acquisition unit that acquires print management information of a printed material printed in a print job during execution, including first information indicating a quality of a printed material and second information indicating an evaluation index of the printed material, which is different from the first information, in the print job during execution;
a print management request acquisition unit that acquires request information indicating a request relating to print management of the printed material in the print job;
a request evaluation unit that evaluates the degree of satisfaction of the printed material printed in the print job for the request relating to the print management indicated by the acquired request information, based on the acquired print management information, using one or more evaluation references;
a printing condition change determination unit that determines whether change in printing conditions in the print job during execution is necessary, based on an evaluation result in the request evaluation unit; and
a printing condition change checking unit that checks, in a case where it is determined by the printing condition change determination unit that the change in the printing conditions in the print job during execution is necessary, the printing conditions after change.

2. The print management device according to claim 1, further comprising:
a printing condition change execution unit that executes, if it is determined by the printing condition change determination unit that the change in the printing conditions is necessary, the change in the printing conditions in the print job during execution.

3. The print management device according to claim 1, further comprising:
a print stopping unit that stops printing if it is determined by the printing condition change determination unit that the change in the printing conditions is necessary.

4. The print management device according to claim 1, further comprising:
a display unit that displays a determination result in the printing condition change determination unit.

5. The print management device according to claim 1, wherein the printing condition change checking unit comprises a printing condition change rule reference unit that makes reference to a predetermined printing condition change rule to check the printing conditions after change.

6. The print management device according to claim 1, wherein the printing condition change checking unit comprises a print management information prediction unit that predicts change in print management information in the printing conditions after change with respect to print management information in the printing conditions before change.

7. The print management device according to claim 1, wherein the print management request acquisition unit acquires request information including priority information indicating priorities of the first information and the second information and an evaluation reference to be applied to the request evaluation unit.

8. The print management device according to claim 7, wherein the print management request acquisition unit acquires an evaluation function in which information included in the print management information is a variable as the priority information, and acquires a threshold value with respect to the evaluation function as the evaluation reference, and
wherein the request evaluation unit evaluates the degree of satisfaction of a printed material printed in the print job for the request relating to the print management indicated by the acquired request information, based on a comparison result obtained by comparing an evaluation value of the printed material printed in the print job, derived by the evaluation function, with the threshold value.

9. The print management device according to claim 8, wherein the print management request acquisition unit acquires the evaluation function expressed as a polynomial including a term in which the first information is a variable and a term in which the second information is a variable, as the priority information.

10. The print management device according to claim 9, wherein the print management request acquisition unit acquires the evaluation function which is the polynomial including the term in which the first information is a variable and the term in which the second information is a variable, in which a sign of the term in which the second information is a variable is different from that of the term in which the first information is a variable in a case where the second information has a trade-off relationship with the first information and a sign of the term in which the second information is a variable is the same as that of the term in which the first information is a variable in a case where the second information has a non-trade-off relationship with the first information.

* * * * *